US012228415B2

United States Patent
Bhambare et al.

(10) Patent No.: US 12,228,415 B2
(45) Date of Patent: Feb. 18, 2025

(54) MANAGING ELECTRIC VEHICLE RANGE IN CHANGING SURROUNDINGS

(71) Applicant: RIVIAN IP HOLDINGS, LLC, Irvine, CA (US)

(72) Inventors: Kamalesh Bhambare, Novi, MI (US); Aratz Harold Pinter Sanchez, Long Beach, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 247 days.

(21) Appl. No.: 17/872,888

(22) Filed: Jul. 25, 2022

(65) Prior Publication Data

US 2024/0027212 A1    Jan. 25, 2024

(51) Int. Cl.
*G01C 21/34* (2006.01)
*B60H 1/00* (2006.01)
*B60L 58/12* (2019.01)
*B60L 58/26* (2019.01)
*G01C 21/36* (2006.01)

(52) U.S. Cl.
CPC ....... *G01C 21/3469* (2013.01); *B60H 1/0073* (2019.05); *B60L 58/12* (2019.02); *B60L 58/26* (2019.02); *G01C 21/3679* (2013.01); *G01C 21/3697* (2013.01); *B60H 2001/00733* (2019.05)

(58) Field of Classification Search
CPC .................................................. G01C 21/3469
See application file for complete search history.

(56) References Cited

U.S. PATENT DOCUMENTS

| 9,043,106 | B2 * | 5/2015 | Ingram | B64C 39/024 |
| | | | | 701/423 |
| 9,527,399 | B2 * | 12/2016 | Kim | B60L 50/15 |
| 10,434,892 | B2 * | 10/2019 | Ko | B60L 53/66 |
| 10,676,077 | B2 * | 6/2020 | Follen | B60H 1/00428 |
| 11,208,062 | B2 * | 12/2021 | Weber | B60W 30/182 |
| 11,247,552 | B2 * | 2/2022 | Follen | B60W 20/12 |
| 11,813,960 | B1 * | 11/2023 | Auerbach | B60L 50/64 |
| 2024/0027212 | A1 * | 1/2024 | Bhambare | G01C 21/3469 |

OTHER PUBLICATIONS

Dunn, "What is Land Rover Terrain Response 2?", URL: https://www.autobytel.com/car-ownership/technology/what-is-land-rover-terrain-response-2-123439/#, retrieved on Jul. 24, 2022 (2 pages).
YouTube Video, URL: https://youtu.be/SBQ1KwZnIFA, accessed on Jul. 25, 2022 (15 pages).

* cited by examiner

*Primary Examiner* — Michael A Berns
(74) *Attorney, Agent, or Firm* — Haley Guiliano LLP; James A. Leiz

(57) ABSTRACT

A vehicle system is configured to determine an expected battery range of a vehicle for a route to a destination, receive status information associated with environmental conditions along the route, determine a change from the expected battery range based on the status information, and facilitate modification of an operating characteristic of one or more electrical components of a vehicle system to compensate for the change.

20 Claims, 7 Drawing Sheets

MANAGING ELECTRIC VEHICLE RANGE IN CHANGING SURROUNDINGS

SUMMARY

In some embodiments, the present disclosure is directed to a method, implemented using control circuitry, for managing an expected battery range of a vehicle that includes determining an expected range for a route to a destination, receiving status information associated with environmental conditions along the route, determining a change from the expected range based on the status information, and facilitating modification of an operating characteristic of one or more electrical components of a vehicle system to compensate for the change. In some embodiments, the method includes identifying a charging station having a location, and modifying the operation of the vehicle system further based on the location of the charging station. In some embodiments, determining the change from the expected range based on the status information includes determining an updated range based on the status information, and comparing the expected range and the updated vehicle range. In some embodiments, determining the expected range is based on a geographic route, terrain information, and weather information.

In some embodiments, modifying operation of the one or more vehicle systems includes identifying the vehicle system based on reference information, and identifying a modification of the vehicle system based on the change in range, the change criterion, or a combination thereof.

In some embodiments, the vehicle system includes a cabin air system, and modifying operation of the vehicle system includes modifying at least one cabin air setting. In some embodiments, the vehicle system includes a battery cooling system, and modifying operation of the vehicle system includes modifying at least one battery cooling setting. In some embodiments, the one or more vehicle systems is configured to operate based on a setpoint, and modifying the operation of one or more vehicle systems includes modifying the setpoint to use less power.

In some embodiments, determining the expected range includes determining a range trajectory based on the geographic route, and determining the change includes identifying a deviation from the range trajectory based on an updated range estimate determined based on the status information. In some embodiments, the method includes updating the range trajectory based on modifying the operation of the one or more vehicle systems.

In some embodiments, the present disclosure is directed to a method for managing range of a vehicle as status information is received. In some embodiments, the actions include receiving status information while progressing along the route, updating a range estimate based on the status information, and determining a modification to operation of one or more vehicle systems based on the range estimate and the position of the charging station. In some embodiments, determining the modification includes determining a difference between the range estimate and an updated range estimate, determining whether to modify the operation of the one or more vehicle systems based on the difference and based on a range criterion, and identifying the one or more vehicle systems based on the reference information. In some embodiments, the method includes determining a route, and locating the position of the charging station along the route.

In some embodiments, the present disclosure is directed to a method for managing range that includes locating a position of a charging station and repeating, at least once, (a) receiving status information associated with environmental conditions while a vehicle is in operation, (b) updating a range estimate based on the status information, and (c) facilitating modification of an operating characteristic of one or more electrical components of a vehicle system based on the range estimate and the position of the charging station.

In some embodiments, facilitating modification of an operating characteristic includes determining a power consumption limit, identifying the vehicle system based on reference information, and causing a reduction in power consumption of the one or more electrical components such that a total power consumption of the vehicle is within the power consumption limit. For example, in some embodiments, the system monitors the aggregate power consumption of all vehicle systems and facilitates modification of the an operating characteristic to limit total power consumption to a predetermine limit (e.g., stored in memory).

In some embodiments, the present disclosure is directed to a system for managing an estimated range of a vehicle. The system includes a communications interface, control circuitry, and an output device. The communications interface is configured to receive status information associated with environmental conditions along a route of a vehicle. The control circuitry is coupled to the communications interface and is configured to determine an expected range along the route, determine a change from the expected range based on the status information, and facilitate modification of an operating characteristic of one or more electrical components of a vehicle system to compensate for the change. The output device is configured to display the expected range to an occupant. For example, because the occupant knows the expected range, changes to the range may affect the occupant, and accordingly, an updated range estimate may also be displayed. In some embodiments, the control circuitry is configured to determine an updated vehicle range based at least in part on the status information. In some embodiments, the control circuitry is configured to determine the expected range based on a geographic route, terrain information, and weather information. In some embodiments, the system is configured to perform the methods disclosed herein.

In some embodiments, the control circuitry is configured to modify the operation of the vehicle system by identifying the vehicle system based on reference information, and identifying a respective modification for the vehicle system based on the change, a change criterion, or both. In some embodiments, the control circuitry is configured to identify a charging station having a location, and modify operation of the vehicle system based on the change from the expected range and based on the location of the charging station.

In some embodiments, the vehicle system includes a cabin air system, and the control circuitry is configured to modify operation of the vehicle system by modifying at least one cabin air setting. In some embodiments, the vehicle system includes a battery cooling system, and the control circuitry is configured to modify operation of the one or more vehicle systems by modifying at least one battery cooling setting. In some embodiments, the vehicle system is configured to operate based on a setpoint, and the control circuitry is configured to modify operation of the vehicle system by modifying the setpoint to use less power.

In some embodiments, the control circuitry is configured to determine the expected range by determining a range trajectory based on the geographic route, determine the change by identifying a deviation from the range trajectory based on an updated range estimate determined based on the status information, and update the range trajectory based on modifying the operation of the one or more vehicle systems.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION OF THE DRAWINGS

Figure 1:
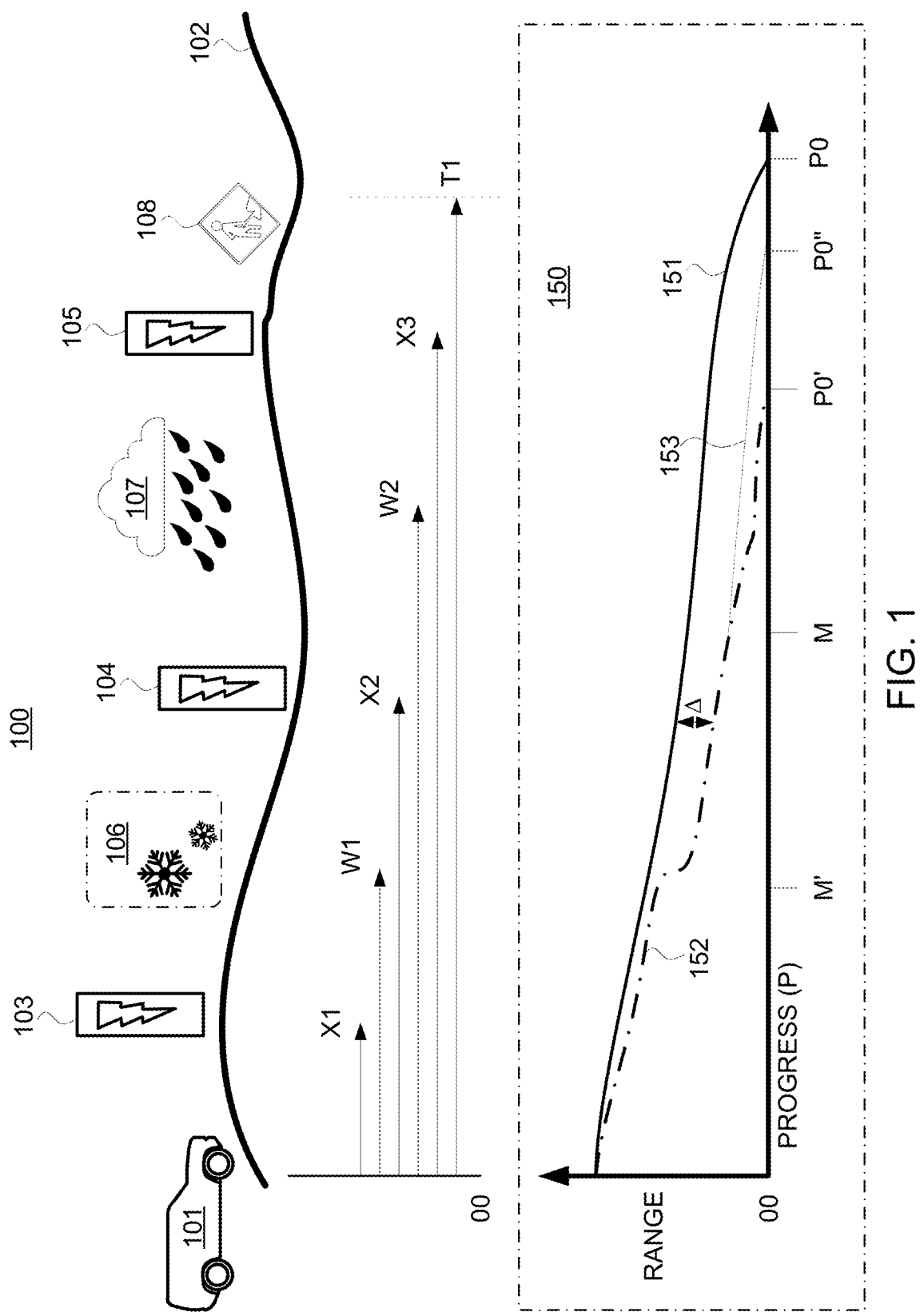
FIG. 1 shows a diagram of an illustrative range, updated range, and managed range, in accordance with some embodiments of the present disclosure.

The present disclosure is directed method and systems for managing an expected range of an electric vehicle under changing conditions and in changing surroundings. In some embodiments, an expected range is updated as status information is received or otherwise determined. In some embodiments, a change from an expected range is determined based on status information. A range may be determined based on route information, reference information, change criteria, range criteria, status information, any other suitable information, or any combination thereof. Route information may include for example, a path or road type, traffic information (e.g., changes or updates to real-time traffic conditions, construction, charging locations), distance, terrain type, elevation, or a combination thereof. Reference information may include statistical information, historical information, ensemble information, user preference information (e.g., desired minimum state of charge, desired minimum range threshold, desired vehicle systems operating characteristics), any other suitable information, or any combination thereof. Vehicle information may include driving behavior, state of charge, vehicle system status or operating characteristics, any other suitable information, or any combination thereof. Status information may include, for example, updates to route information (e.g., traffic, accident, road closures, or changes to a path or road type), weather information (e.g., changes or updates in weather patterns that affect vehicle range, road conditions resulting from weather), updates to vehicle information, updates to reference information, any other suitable information, or any combination thereof. Status information may be received or determined in real time to determine changes to an expected range, for example. For example, the system may determine a route, locate charging stations along the route, determine and update an expected range, and modify operation of one or more vehicle systems if the expected ranges changes during progression along the route. As used herein, "range," "battery range," and "vehicle range" as used herein refer to an quantity indicative of available or remaining operating capacity (e.g., distance, drive time) until a nominal state of the battery pack (e.g., a lower threshold of state of charge, remaining stored energy, or other suitable characteristic) before the next charging event (e.g., the range is reset or otherwise increased by charging). For example, a range may be estimated in units of distance (e.g., miles, km), time (e.g., minutes, hours), or any other suitable basis. In a further example, greater range may be associated with greater storage capacity (e.g., more batteries or battery capacity), reduced consumption (e.g., lower cumulative current draw), or a combination thereof. To illustrate, a "range estimate" may also be referred to as a "battery range estimate" or "vehicle range estimate." To illustrate further, an "expected battery range" may be the same as an "estimated battery range," which may be updated to determine an "updated battery range estimate."

FIG. 1 shows a diagram of an illustrative range, updated range, and managed range, in accordance with some embodiments of the present disclosure. Panel 100 illustrates vehicle 101 intending to progress along route 102, from origin 00 to a destination at position T1. Progress P may be provided in distance, time, changes thereof, or any other suitable metric indicating relative progress along route 102. Along route 102 are located charging stations 103, 104, and 105, at respective positions X1, X2, and X3. As illustrated, weather events occur at or near positions W1 (e.g., snowstorm 106) and W2 (e.g., rainstorm 107). Further, construction 108, and associated traffic, detours, delays, or a combination thereof occurs between positions X3 and T1. Panel 150 illustrates expected battery range 151 resulting in an end position of P0, which is well past any of charging stations 103-105, and just past the destination at T1. Updated range estimate 152, which takes into account driving information (e.g., actual operation of the powertrain and auxiliary systems), weather information, traffic information, any other suitable information, or any combination thereof, is determined during the route progression. Managed range estimate 153 results from vehicle 101 (e.g., control circuitry thereof) modifying operation (e.g., beginning at point M, as illustrated) to extend the estimated range based on the updated range estimate 152, position of charging stations (e.g., charging station 105), user preferences, reference information, status information, any other suitable information, or any combination thereof.

To illustrate, at the origin 00, vehicle 101 may determine that it may reach the destination at T1 without charging (e.g., the estimated range is beyond T1). However, vehicle 101 may determine that at least one charging is needed along route 102 to ensure the destination is reached (e.g., that vehicle 101 has a state of charge (SOC) greater than a threshold when arriving at T1). Accordingly, vehicle 101 may update the range estimate to determine if the destination can be reached, the next charger can be reached, whether range needs to be extended, or a combination thereof.

As vehicle 101 progresses along route 102, updated range estimate 152 may diverge from expected battery range 151 (e.g., an initial estimate) as conditions along route 102 change, as driving behavior changes, or both. For example, expected battery range 151 may be based on route 102 (e.g., a distance along a predetermined path of roads), terrain information (e.g., road type, elevation or changes thereof, road curvature, estimated traffic patterns, estimated weather patterns), user preference information (e.g., driving mode such as all-wheel drive (AWD) or rear-wheel drive (RWD), cabin air settings, acceptable state of charge threshold), vehicle characteristic information (e.g., battery cell type and condition or state of health of the battery module, tire condition and tire type—street or all-weather tires, suspension settings, etc.), reference information (e.g., statistical or projected range based on driving history, an ensemble of vehicles, or other suitable reference information), any other suitable information, or any combination thereof. As vehicles progresses along route 102, the estimated range may change gradually due to driving behavior, abruptly due to events (e.g., real time updates to estimated range), or a combination thereof. For example, as illustrated by updated range estimate 152, a relatively abrupt change (e.g., indicated by difference A along the progression) is indicated at about position W1 corresponding to snowstorm 106. For example, vehicle 101 may receive a weather condition update, and in response, update expected battery range 151 to generate updated range estimate 152 (e.g., at or near position W1, or at some other time or position). Accordingly, vehicle 101 may update a range estimate at a predetermined frequency or schedule, upon receiving information, upon user request, in response to any suitable event, or at any other suitable time.

As the change A increases (e.g., beyond a threshold), vehicle 101 (e.g., control circuitry thereof) may determine that operation of one or more systems of vehicle 101 is to be modified to increase range. For example, by modifying operation of the one or more systems, vehicle 101 may generate modified range estimate 153, which indicates an increased estimated range as compared to updated range estimate 152. For example, updated range estimate 152 may indicate that vehicle 101 will just make it to charging station 105, but may lead to range anxiety for the driver (e.g., if any other driving conditions change that may lessen range). Accordingly, by extending the range as indicated by modified range estimate 153, vehicle 101 may manage range and thus help to reduce range anxiety as driving conditions along route 102 change in time or otherwise during progress along route 102. Vehicle 101 may modify operation of the one or more systems to achieve an original range estimate (e.g., to achieve position P0 rather than P0'), increase range by a predetermined amount, achieve a predetermined state of charge when arriving at the next charging station, reduce or otherwise manage the number of charging events (e.g., to improve trip continuity), or a combination thereof. Although not illustrated in FIG. 1, if vehicle 101 receives weather updates sooner, before encountering snowstorm 106, vehicle 101 may be able to begin modifying operation at M' rather than M, allowing a less drastic modification to achieve the desired range (e.g., less noticeable to the occupant). In some embodiments, vehicle 101 may receive status information indicating future or soon-to-be-encountered weather events (e.g., occurring further along route 102), and accordingly may modify operation of one or more vehicle systems to compensate for an estimated increase in power consumption by other vehicle systems (e.g., anticipate a change to four-wheel drive, anticipate increased HVAC demand and consumption). To illustrate, at position X1, if vehicle 101 receives status information that snowstorm 106 or rainstorm 107 has formed or worsened, then vehicle 101 may begin modifying operation of vehicle systems at position X1 prior to reaching positions W1 or W2, in order to maintain overall power consumption for the trip within a predetermined range (e.g., within a threshold of expected battery range 151).

In an illustrative example, a driver may start by selecting a destination set in a global positioning system (GPS) module of the vehicle. The driver may select the destination on a map presented on a display screen, enter a business name, place name (e.g., city, neighborhood, park, area, or building), coordinates, or select the destination based on a combination thereof. As driver progresses along the route, they may encounter changes in weather, road conditions, anticipated vehicle status, or a combination thereof. For example, when faced with severe cold, rain, heat, or other weather condition, the driver may use more power for HVAC and battery cooling. In some circumstances, heating, ventilation, and air conditioning (HVAC) use can reduce range by 60%. Range may also be affected by vehicle ride height (e.g., a driver may select constant ride height or use four-wheel drive throughout). In response to the changing range estimate, the driver may need to determine when to charge the vehicle and how close they are to a charging station. Reductions in range of the vehicle may induce range anxiety of the driver (e.g., if not managed). While a driver may manually take steps to modify operation of the vehicle (e.g., systems thereof), the steps may be implemented too late, or not taken at all by most users. For example, in some circumstances, very few people would likely actually use an automatic temperature controller (e.g., just 25%).

Vehicle 101 may be configured to automatically manage range in order to reduce range anxiety, manage charging, or both. In some embodiments, vehicle 101 includes an adaptive driving mode that, when enabled, allows vehicle 101 to manage range based on weather conditions, driving conditions, vehicle conditions, any other suitable conditions, based on any other suitable information, or any combination thereof. For example, vehicle 101 may provide weather adaptability by checking weather conditions or changes thereof along the route, checking a range available, and take steps to maximize range. In a further example, the steps may include enabling automatic temperature control and a reduced air conditioning (AC) setpoint of a cabin air system for bare minimum comfort (e.g., 2° C. lower than standard or reference setpoints for that weather). In a further example, the steps may include turning OFF seat heating and cooling. In a further example, the steps may include reducing battery system heating and cooling. In a further example, the steps may include enabling an Advanced Driver Assistance System (ADAS) that controls for lane departure and self-driving when visibility is poor (e.g., in event of rain or fog). In a further example, the steps may include enabling an automatic defogging or defrosting system. In a further example, the steps may include facilitating change from a sport or performance drive mode to a conserve drive mode.

In an illustrative example, vehicle 101 may be configured to provide terrain adaptability. For example, vehicle 101 may be configured to check terrain (e.g., along the selected route) under current driving conditions. Vehicle 101 may, in response, reduce ride height (e.g., if not required based on the terrain, road type, or cargo), change a driving mode to two-wheel (e.g., and back to four-wheel in rough terrain conditions), limit top speed or torque, modify operation of any other suitable vehicle system in response to changes in terrain, or any combination thereof.

In an illustrative example, vehicle 101 may be configured to manage charging events (e.g., predictability of charging events, location, and/or frequency). Vehicle 101 may be configured to estimate a distance to a charger (e.g., a distance between a current location along the route and the charger) and a consumption rate (e.g., based on projected vehicle operating characteristics, historical information, reference information, measured data, and/or real-time data). In some embodiments, vehicle 101 is configured to suggest a charging event time and location to the driver based on the estimated range, destination, status information, any other suitable information, or any combination thereof. For example, by managing range and charging events (e.g., using artificial intelligence or other suitable data processing technique), vehicle 101 may be able to achieve a relatively greater range, reduce range anxiety of the driver, reduce charging events, or a combination thereof. In an illustrative example, if vehicle 101 is charged at any or all of charging stations 103, 104, or 105, then expected battery range 151 may exhibit respective step increases (e.g., at position X1, X2, or X3), each of which then may cause the system to reset the estimation of range (e.g., generate a new expected battery range 151), which would be indicated as an upward shift in panel 150 (not shown). To illustrate, in some embodiments, expected battery range 151 is indicative of a maximum or otherwise estimated upper limit in available operating capacity (e.g., available distance to travel) until the next charging event resets the estimation.

In an illustrative example, a driver driving vehicle 101 may embark on a cross-country trip (e.g., route 102 may be relatively long, over a large variation in terrain). During the trip, the driver may encounter sudden (e.g., unexpected as of beginning the trip) severe storm suddenly, traffic congestion or detours, varying vehicle operating characteristics or performance, intermittent charging locations (e.g., distance between X1 and X2, or X2 and X3), availability of chargers at charging locations, charging speeds at charging locations, reduced range, or a combination thereof. The driver may need to adjust to the severe weather by pausing the trip, slowing down, adjusting HVAC settings, controlling traction (e.g., all-wheel drive), or other changes. Vehicle 101, by managing the estimated range, may be configured to achieve good traction on slippery roads, use self-driving operation, manage a defroster (e.g., control ON and OFF), reduce HVAC usage, or otherwise manage operation of the vehicle to extend range and ensure performance.

Figure 2:
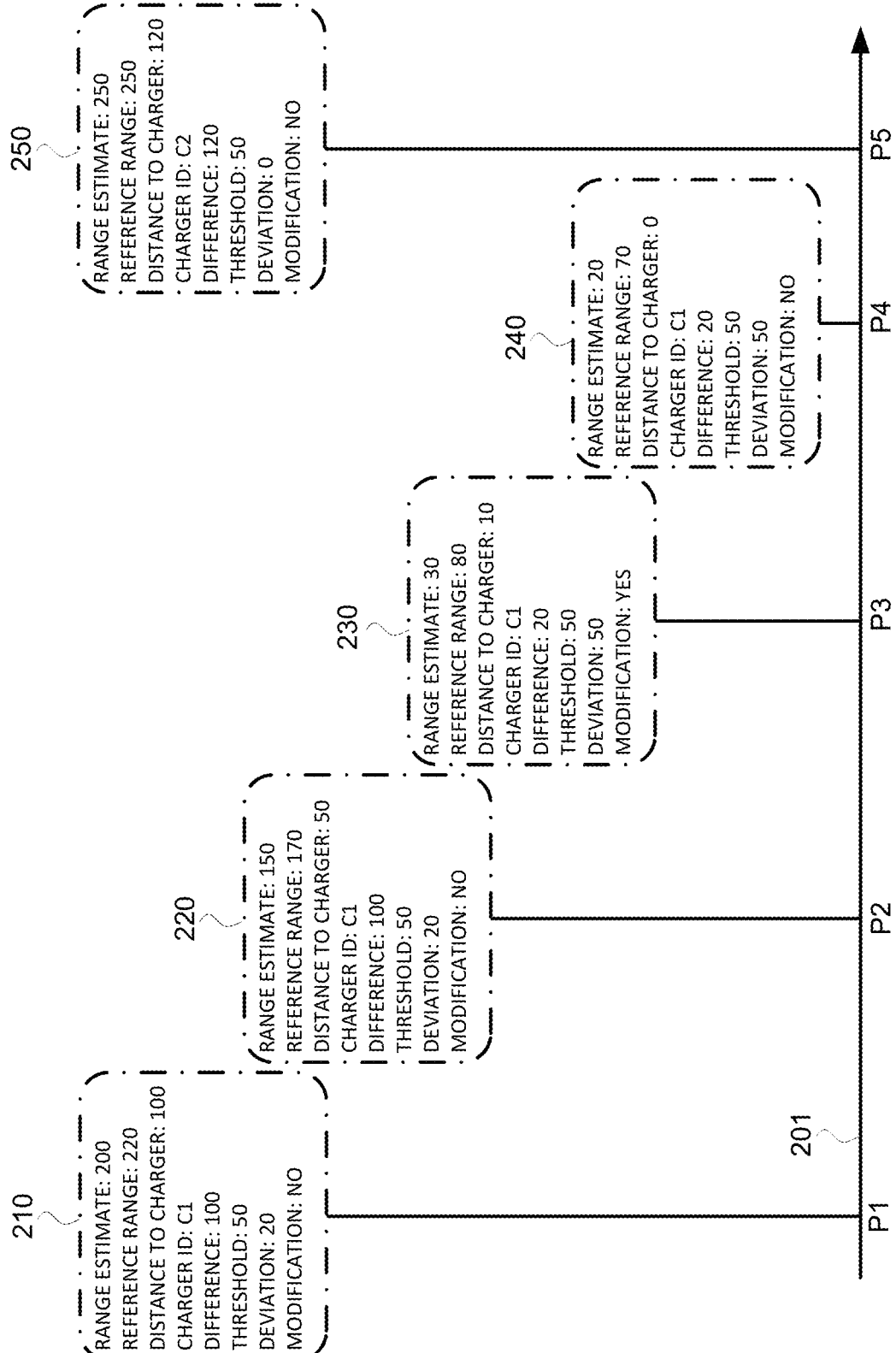
FIG. 2 shows a block diagram of illustrative range metrics determined along a route, in accordance with some embodiments of the present disclosure.

FIG. 2 shows a block diagram of illustrative range metrics determined along route 201, in accordance with some embodiments of the present disclosure. For example, route 201 may be similar to route 102 of FIG. 1. Range metrics may include values (e.g., scalar or vector values), states, classifications, or qualitative descriptors that are associated with vehicle range, charging events, modifying vehicle operation. The numbers indicated in FIG. 2 are merely illustrative, and it will be understood that range metrics may depend on the vehicle, the route, locations of chargers, events, settings, and/or other information. In the context of FIG. 2, distances are provided in illustrative "units" (e.g., 100 units), because the measuring system may be any suitable system (e.g., miles, kilometers, or other unit type). Panels 210, 220, 230, 240, and 250 correspond to progression along route 201, and are shown in respective temporal order (e.g., panel 240 shows metrics that occur at a time later than panel 230, etc.). Positions P1, P2, P3, P4, and P5 correspond to successive positions along route 201.

Panel 210 corresponds to a first time and position along route 201. As illustrated, panel 210 indicates a range estimate of 200 units, reference range of 220 units, distance to charger of 100 units, charger identifier (ID) of C1, a difference (between range estimate and distance to charger) of 100 units, a threshold (for comparing to the difference) of 50 units, a deviation (between the reference range and the estimated range) of 20 units, and a determination of whether to modify a vehicle system to manage range. At the point of progression of panel 210, the vehicle estimates a range of 200 units, which deviates 20 units from the reference range (e.g., calculated based on reference information, or based on a previous range estimate). This deviation may arise from, for example, driving patterns or systems usage that consume more power as compared to a reference vehicle operation, or from changes in environmental conditions such as unforeseen or unaccounted for storms or inclement weather that would impact range, road conditions (e.g., paved, gravel), traffic, terrain (e.g., elevated/hilly, flat) visibility, or other changes along the determined route. At position P1, for example, the system is determining that modification is not needed. For example, the system may determine that modification is not needed because the difference is greater than the threshold, indicating that the vehicle has sufficient estimated range to reach charger C1. In a further example, the system may determine that modification is not needed because the deviation is less than the threshold, indicating that the vehicle is operating as expected based on the reference information. The vehicle may include one or more thresholds or threshold ranges, and compare a difference, a deviation, or metric to the one or more thresholds or threshold ranges to determine whether to modify one or more vehicle systems. The point of progression and updated range estimate may be computed at random intervals (e.g., every minute or ten minutes), or upon the system detecting a change in an environmental condition (e.g., storm or heavy traffic upcoming in the next 10 miles), or when an operating condition of the vehicle changes (e.g., driver turns on HVAC or adjust drive mode), or any combination thereof.

Panel 220 corresponds to a second time and position along route 201. The vehicle at P2 has progressed 50 units along route 201 from P1. As illustrated, panel 220 indicates a range estimate of 150 units, reference range of 170 units, distance to charger of 50 units, charger identifier (ID) of C1, a difference (between range estimate and distance to charger) of 100 units, a threshold (for comparing to the difference) of 50 units, a deviation (between the reference range and the estimated range) of 20 units, and a determination of whether to modify a vehicle system to manage range. At the point of progression of panel 220, the vehicle estimates a range of 150 units, which deviates 20 units from the reference range (e.g., calculated based on reference information, or based on a previous range estimate). The deviation at P2 is the same as P1, indicating that from P1 to P2 the vehicle was operated similar to the reference information (e.g., no unforeseen events or increased consumption by vehicle systems). At position P2, for example, the system is determining that modification is not needed. For example, the system may determine that modification is not needed because the difference is greater than the threshold, indicating that the vehicle has sufficient estimated range to reach charger C1. In a further example, the system may determine that modification is not needed because the deviation is less than the threshold, indicating that the vehicle is operating as expected based on the reference information.

Panel 230 corresponds to a third time and position along route 201. The vehicle at P3 has progressed 40 units along route 201 from P2 (e.g., and is 90 units from P1). As illustrated, panel 230 indicates a range estimate of 30 units, reference range of 80 units, distance to charger of 10 units, charger identifier (ID) of C1, a difference (between range estimate and distance to charger) of 20 units, a threshold (for comparing to the difference) of 50 units, a deviation (between the reference range and the estimated range) of 50 units, and a determination of whether to modify a vehicle system to manage range. At the point of progression of panel 230, the vehicle estimates a range of 30 units, which deviates 50 units from the reference range (e.g., calculated based on reference information, or based on a previous range estimate). The deviation at P3 is greater than at P2 or P1, indicating that from P2 to P3 the vehicle experienced unforeseen events, more consumptive driving, or otherwise increased consumption by vehicle systems. At position P3 or some position between position P2 and P3, for example, the system is determining that modification is needed. For example, the system may determine that modification is needed because the difference is less than the threshold, indicating that the vehicle might not have sufficient estimated range to reach charger C1. In a further example, the system may determine that modification is needed because the deviation is greater than the threshold, indicating that the vehicle is not operating consistent with the reference information. At position P3, or otherwise some position between P2 and P3, the vehicle may modify one or more vehicle systems to extend the vehicle range to ensure that charger C1 is reached, lessen range anxiety experienced by the user, or otherwise to extend the estimated range.

Panel 240 corresponds to a fourth time and position along route 201, at which point charger C1 is just reached (e.g., just prior to charging the vehicle). The vehicle at P4 has progressed 10 units along route 201 from P3 (e.g., and is 50 units from P2, and 100 units from P1). As illustrated, panel 240 indicates a range estimate of 20 units, reference range of 70 units, distance to charger of 10 units (i.e., at charger C1), charger identifier (ID) of C1, a difference (between range estimate and distance to charger) of 20 units, a threshold (for comparing to the difference) of 50 units, a deviation (between the reference range and the estimated range) of 50 units, and a determination of whether to modify a vehicle system to manage range. At the point of progression of panel 240, the vehicle estimates a range of 20 units, which deviates 50 units from the reference range (e.g., calculated based on reference information, or based on a previous range estimate). The deviation at P4 is the same as at P3, indicating that from P3 to P4 the vehicle adapted to prevent the deviation from increasing, for example. At position P4 or some position between position P3 and P4, for example, the system is determining that modification is no longer needed because either C1 is reached or the difference is so low as to be insignificant (e.g., the vehicle is "almost" at C1). For example, the system may determine that the vehicle is likely to reach charger C1 based on the range estimate and thus modifying the vehicle system is no longer needed. When the vehicle parks at C1, located at P4, the remaining estimated range is 20 units.

Panel 250 corresponds to a fifth time and position at which point the vehicle was just charged at C1, and is not progressing along route 201. As illustrated, panel 250 indicates a range estimate of 250 units, reference range of 250 units, distance to charger of 120 units, charger identifier (ID) of C2, a difference (between range estimate and distance to charger) of 120 units, a threshold (for comparing to the difference) of 50 units, a deviation (between the reference range and the estimated range) of 0 units, and a determination of whether to modify a vehicle system to manage range. At the point of progression of panel 250, the vehicle estimates a range of 250 units, which does not deviate from the reference range (e.g., calculated based on reference information, or based on a previous range estimate). For example, because the vehicle was just charged at C1, no deviation has yet arisen from events or operation. At position P5, for example, the system is determining that modification is not needed, as there is more than sufficient range to reach the next charger C2. For example, the system may determine that modification is not needed because the difference is greater than the threshold, indicating that the vehicle has sufficient estimated range to reach charger C2. In a further example, the system may determine that modification is not needed because the deviation is less than the threshold, indicating that the vehicle is operating as expected based on the reference information.

In an illustrative example, referencing FIG. 2, when the vehicle is at P1, C1 is 100 units away and C2 is about 220 units away (e.g., P5 is just after P4). The vehicle could, at P1, determine that to reduce charging frequency (or based on user preference), charger C2 is to be reached rather than C1. In order to reach C2, at P1 or just after, the vehicle may determine to modify operation of one or more vehicle systems to extend the estimated range to at least 220 units (e.g., to exceed 220 units by a suitable amount). Accordingly, the system may determine to modify operation at P1 or otherwise early along route 201 to reduce consumption to conserve power to extend range. For example, the vehicle may be able to pass charger C1 without stopping to reach C2, thus reducing charging frequency, shortening travel times, or otherwise providing for a more continuous trip. In some embodiments, at any position (e.g., P1-P5), there may be a plurality of available chargers that each have an associated ID and distance. For example, at P1, the vehicle may determine C1, C2, and C3-CN are available or nearby chargers (e.g., within some predetermined distance), and determine a distance to each. Accordingly, the system may manage which charger is targeted for charging to adapt to changing driving conditions. If C2 were selected at P1 as the target charger, but weather conditions between P2 and P3 were extreme and the estimated range dropped significantly, then the vehicle may determine that C1 rather than C2 is the target charger so prevent range anxiety in the driver or otherwise more confidently ensure reaching the charger (e.g., possibly at the expense of charging frequency).

Figure 3:
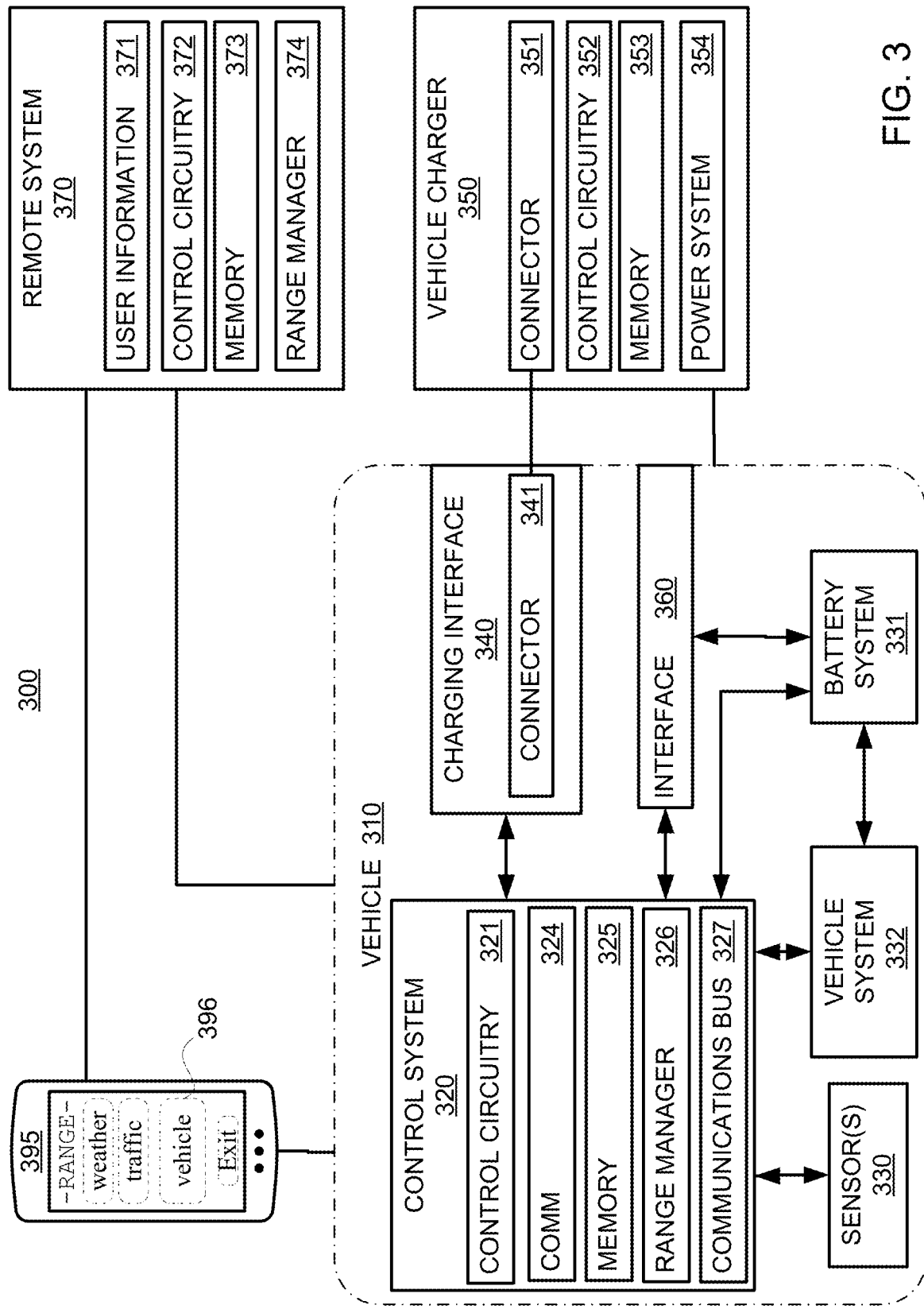
FIG. 3 shows a block diagram of an illustrative system for managing range, in accordance with some embodiments of the present disclosure.

FIG. 3 shows a block diagram of an illustrative system for managing range, in accordance with some embodiments of the present disclosure. As illustrated, system 300 includes vehicle 310, vehicle charger 350, remote system 370, and device 395. Vehicle 310, as illustrated, includes control system 320, charging interface 340, battery system 331, sensors 330, interface 360 (e.g., a user interface), and vehicle system(s) 332. In an illustrative example, vehicle 310 may be same as vehicle 101 of FIG. 1.

Control system 320, as illustrated, includes control circuitry 321 (e.g., as implemented by one or more electronic control units or ECUs), memory 325 (e.g., configured to store computer instructions), communications interface 324 (comm 324), communications bus 327, and optionally range manager 326. Control circuitry 321 may include a processor, a communications bus (e.g., in addition to or instead of communications bus 327), memory (e.g., in addition to or instead of memory 325), power management circuitry, a power supply, any suitable components, or any combination thereof. Memory 325 may include solid state memory, a hard disk, removable media, any other suitable memory hardware, or any combination thereof. In some embodiments, memory 325 is non-transitory computer readable media configured to store computer instructions that, when executed, perform at least some steps of any of process 400, process 500, or process 700 described in the context of FIGS. 4-5, or 7. In some embodiments, instructions are preprogrammed into memory 325, memory of one or more ECUs, or a combination thereof, for performing diagnostics, determining vehicle information (e.g., including vehicle operating information), determining or receiving status updates, managing range estimates, or a combination thereof (e.g., as performed by range manager 326). In some embodiments, the instructions are loaded or otherwise provided to control circuitry 321 to perform diagnostics, manage an estimated range, or a combination thereof. To illustrate, range manager 326 may be implemented by control circuitry 321, operate separately but in communication with control circuitry 321 (e.g., via communications bus 327), or a combination thereof.

Control system 320 may include an antenna and other control circuitry, or any combination thereof, and may be configured to access the internet, a local area network, a wide area network, a Bluetooth-enable device, an NFC-enabled device, any other suitable device using any suitable protocol, or any combination thereof. In some embodiments, control system 320 includes or otherwise is coupled to interface 360, which may include, for example, a screen, a touchscreen, a touch pad, a keypad, one or more hard buttons, one or more soft buttons, a microphone, a speaker, any other suitable components, or any combination thereof. For example, in some embodiments, interface 360 includes all or part of a dashboard, including displays, dials and gauges (e.g., actual or displayed), soft buttons, indicators, lighting, and other suitable features. In a further example, interface 360 may include one or more hard buttons arranged at the exterior of the vehicle, interior of the vehicle (e.g., at the dash console), or at a dedicated keypad arranged at any suitable position. In a further example, interface 360 may be configured to receive input from device 395, haptic input from a user, or both.

Comm 324 may include one or more ports, connectors, input/output (I/O) terminals, cables, wires, a printed circuit board, control circuitry, any other suitable components for communicating with other units, devices, or components, or any combination thereof. In some embodiments, control system 320 (e.g., ECUs thereof) is configured to control a drivetrain (e.g., control an engine, electric motor, transmission, brake), cooling system, cabin air system, braking system, autonomous control system, steering system, suspension system, control or manage battery system 331, determine or receive status information, communicate with other units, perform any other suitable actions, or any combination thereof. In some embodiments, comm 324, interface 360, or both, may be configured to send and receive wireless information between control system 320 and external devices such as, for example, remote system 370 (e.g., a server, a WiFi access point), charger 350, device 395 (e.g., a user device such as a smart phone), keyfobs, any other suitable devices, or any combination thereof. In some embodiments, communications bus 327 is integrated with comm 324 (e.g., communicatively coupling ECUs, charging interface 340, interface 360). In some embodiments, communications bus 327 may be coupled to comm 324. Communications bus 327 may include or otherwise be coupled to terminals of connector 341 of charging interface 340, terminals of ECUs, range manager 326, any other suitable components, or any combination thereof.

Battery system 331 is coupled to charging interface 340 and may include, for example, a vehicle battery pack that may include a plurality of battery cells. For example, battery system 331 may include battery cells, busbars, current collectors, enclosures, DC bus cables or otherwise conductors, contactors, switches, sensors and instrumentation, any other suitable components, or any combination thereof.

As illustrated, vehicle charger 350 includes connector 351 (e.g., for engaging with connector 341 to interface to vehicle 310), control circuitry 352 (e.g., configured to manage charging and payment), memory 353 (e.g., configured to store computer instructions for managing charging and payment), and power system 354 (e.g., power electronics for providing charging current to vehicle 310). Vehicle charger 350 is located at a position accessible along a route (e.g., roadside, in a parking lot, at a facility, or otherwise accessible to vehicle 310). As illustrated, vehicle charger 350 includes connector 351, control circuitry 352, memory 353, and power system 354. For example, connector 351 of vehicle charger 350 may be connected to connector 341 (e.g., by plugging the mating connectors together to engage electrical pins and sockets). In some embodiments, vehicle charger 350 is a handheld device. In some embodiments, vehicle charger 350 may be or include a module configured to plug into connector 341 and transmit wireless or wired signals to remote processing equipment (e.g., of remote system 370 or device 395). It will be understood that a plurality of vehicle chargers may be arranged at respective positions, and vehicle 310 is configured to be charged at any of the vehicle chargers (e.g., depending on the route, range, or driver preference).

As illustrated, remote system 370 includes user information 371, control circuitry 352 (e.g., configured to manage or determine status information), memory 353 (e.g., configured to store computer instructions for managing status information), and range manager 374 (e.g., configured to determine a range or an updated range). In some embodiments, user information 371 may be stored in memory 373, for example, and need not be separate. Remote system 370 may push updates to vehicle 310 (e.g., via a communications network to comm 324), respond to queries from vehicle 310, device 395, any other suitable device, or a combination thereof.

In an illustrative example, vehicle 310 may include an on-board range estimating system that includes range manager 326. Range manager 326 may be associated with control circuitry of a particular ECU of control circuitry 321, distributed among ECUs of control circuitry 321 (e.g., connected by communications bus 327), a separate controller, any other suitable control circuitry, or any combination thereof. In some embodiments, range manager 326 may be configured to generate a range estimate (e.g., a range trajectory of progress-range pairs, a set of range values, or a single value corresponding to a particular position or time), update the range estimate, measure or determine vehicle operating information (e.g., measured or estimated consumption, activated or deactivated systems or features), receive status information (e.g., from remote system 370), retrieve reference information, identify vehicle system(s) 332 for modification to extend range, determine a modification, determine charger location, determine remaining distances and times (e.g., from a current position or time to some target destination or future time), perform any other operation, or any combination thereof. In some embodiments, range manager 326, memory 325, or both, are configured to store information for determining range (e.g., generating a range estimate). In some embodiments, range manager is configured to generate a display at interface 360 to show the occupant a range estimate, an update thereof, or information corresponding to modification of vehicle system(s) 332 (e.g., a new setpoint, a change in setpoint, a new limit, an increase in range arising from modification, or a combination thereof). In an illustrative example, vehicle system(s) 332 may be configured to operate based on a setpoint, and control circuitry 321, range manager 326, or a combination thereof is configured to modify operation of the vehicle system by modifying the setpoint to use less power.

In an illustrative example, comm 324 is configured to receive status information (e.g., from remote system 370) about a route of vehicle 310, and interface 360 includes an output device such as a screen configured to display the expected range to an occupant. Control circuitry 321 may be configured to determine an expected range for a route, determine a change from the expected range based on the status information, and modify operation of one or more vehicle systems 332 to compensate for the change.

In an illustrative example, control circuitry 321, range manager 326, or a combination thereof is configured to determine an updated vehicle range based at least in part on the status information, which may be received by remote system 370.

In an illustrative example, control circuitry 321, range manager 326, or a combination thereof is configured to modify the operation of one or more vehicle systems 332 by identifying the one or more vehicle systems 332 based on reference information (e.g., stored in memory 325, received from remote system 370), and identifying a respective modification for the one or more vehicle systems 332 based on the reference information, change criteria, modification preferences, or other suitable criteria. For example, reference information may include vehicle information (e.g., vehicle identification number (VIN), make/model, power train specifications), thresholds, limits, ranges of operation, hierarchy of system modifications to reduce power consumption (e.g., which vehicle systems to modify, how much to modify, and in which order to modify), any other suitable information, or any combination thereof. Memory 325 may store any suitable information about the vehicle and systems thereof, operation of the vehicle and systems thereof, criteria for modifying operation, any other suitable information, or any combination thereof. In some embodiments, reference information may include a power consumption limit, and control circuitry 321, range manager 326, or a combination thereof is configured to modify the operation of one or more vehicle systems 332 to limit the aggregate power consumption of vehicle 310 to within the power consumption limit. Each of vehicle system(s) 332 may have an associated operating characteristic of one or more electrical components, which may be modified to reduce power consumption. For example, operating characteristics may include setpoints, current draw, or other suitable characteristic, where electrical components may include screens, motors, actuators, or any other suitable components having an associated power consumption.

In an illustrative example, control circuitry 321, range manager 326, or a combination thereof is configured to identify a charging station having a location (e.g., vehicle charger 350), and modify operation of the one or more vehicle systems 332 based on the change from the expected range and based on the location of the charging station.

In some embodiments, vehicle system(s) 332 includes cabin-based systems for occupant comfort or interior environment control. In an illustrative example, vehicle system(s) 332 includes a cabin air system, and control circuitry 321, range manager 326 or a combination thereof is configured to modify or cease modifying at least one cabin air setting such as air-conditioning setpoint, fan setpoint, heating temperature setpoint, total heating or cooling rate, duration of heating or cooling, or a combination thereof. In some embodiments, for example, control circuitry 321, range manager 326, or a combination thereof is configured to reduce an AC setpoint for a bare-minimum comfort level (e.g., such as 2° C. lower than a standard setpoint for the same weather or environmental condition). In some embodiments, for example, control circuitry 321, range manager 326, or a combination thereof is configured to turn seat heating and cooling ON or OFF to conserve power consumption. In some embodiments, for example, control circuitry 321, range manager 326, or a combination thereof is configured to enable automatic defogging or defrosting if weather conditions would lead to reduced visibility through window glass.

In an illustrative example, vehicle system 332 includes a battery cooling system for cooling battery system 331, and control circuitry 321, range manager 326, or a combination thereof is configured to modify or cease modifying at least one battery cooling setting such as a fluid (e.g., coolant) temperature, component temperature (e.g., a battery module of battery system 331), a fluid flow rate, a valve setting, a during of fluid flow (e.g., controlling a fluid pump on and off), or a combination thereof. In some embodiments, for example, control circuitry 321, range manager 326, or a combination thereof is configured to reduce battery heating or cooling, powertrain heating and cooling, or a combination thereof to reduce power consumption and extend range.

In some embodiments, vehicle system(s) 332 includes drive systems for adjusting steering, suspension, drive torque, or a combination thereof. In an illustrative example, vehicle system(s) 332 includes a drivetrain for applying torque to drive wheels, and control circuitry 321, range manager 326, or a combination thereof is configured to modify or cease modifying at least one drivetrain setting such as a maximum torque, maximum current (e.g., in a motor phase, in a DC bus line), drive mode (e.g., two-wheel, four-wheel, front-wheel, rear-wheel), maximum vehicle speed, maximum vehicle acceleration, maximum power consumption rate (e.g., of a system, set of systems, or in total), braking (e.g., regenerative braking optimized for generating), or a combination thereof. In some embodiments, for example, control circuitry 321, range manager 326, or a combination thereof is configured to reduce ride height if increased height is not required because of the terrain (e.g., to improve aerodynamics and power consumption). In some embodiments, for example, control circuitry 321, range manager 326, or a combination thereof is configured to change a driving mode to two-wheel, and then back to four-wheel in rough terrain conditions (e.g., off-road, gravel road, non-paved road, or roads in poor condition). In some embodiments, for example, control circuitry 321, range manager 326, or a combination thereof is configured to change a front/rear torque split to reduce power consumption, provide greater traction, or both at respective times by managing the torque split.

In an illustrative example, vehicle system(s) 332 includes a lighting system for providing light, and control circuitry 321, range manager 326, or a combination thereof is configured to modify or cease modifying at least one light setting such as adjusting ON/OFF of single light or bank of lights, brightness, duration, ON/OFF trigger setting (e.g., light/dark settings, motion settings), or a combination thereof.

In an illustrative example, vehicle system(s) 332 includes an ADAS for controlling lane departure and driving mode, and control circuitry 321, range manager 326, or a combination thereof is configured to manage the ADAS to adapt to weather conditions, reduce power consumption, or both.

In some embodiments, control circuitry 321, range manager 326, or a combination thereof is configured to determine the expected range based on a geographic route, terrain information, and weather information, which may be received from remote system 370. In some embodiments, control circuitry 321, range manager 326, or a combination thereof is configured to determine the expected range by determining a range trajectory based on the geographic route, and determine a change in expected range by identifying a deviation from the range trajectory based on an updated range estimate determined based on the status information (e.g., received from remote system 370, determined by control system 320). In some embodiments, control circuitry 321, range manager 326, or a combination thereof is configured to update the range trajectory based on modifying the operation of the one or more vehicle systems 332. For example, as the operation is modified, power consumption may be reduced and range might not decrease at the same rate prior to the modification. Accordingly, if the estimated range increases or otherwise does not decrease as much, then control circuitry 321, range manager 326, or a combination thereof may determine whether continued modification is needed.

In an illustrative example, vehicle 310 (e.g., control system 320 thereof) may optionally receive status information from device 395 or any other suitable device or system, which may receive status information from an information source. In some embodiments, an application executed on device 395 may include a graphical interface depicting one or more soft buttons 396, each corresponding to a particular function associated with battery range, and extension thereof, for vehicle 310. An application provided by an entity associated with the vehicle may be downloaded and executed on a user's mobile device to provide certain functions. For example, of the application may display one or more soft buttons 396, and once selected, control circuitry of device 395 may receive a signal that corresponds to the button press (e.g., from an electrical switch or sensor coupled to the button), and in response generate a message or otherwise signal for transmitting to a communications interface of vehicle 310 (e.g., comm 324). In an illustrative example, the user may select an application implemented on device 395 to view range estimates or other information provided by control system 320. As illustrated, soft buttons 396 include a "weather" button (e.g., to identify weather information or updates thereof from an information source such as remote system 370), a "traffic" button (e.g., to identify road conditions or updates thereof from an information source such as remote system 370), and a "vehicle" button (e.g., to provide settings, setpoints, thresholds, or other preferences for extending range). In some embodiments, any of soft buttons 396 or functionality of device 395 may be implemented using interface 360, control system 320, or a combination thereof. For example, a user view of range estimates or select preferences for modifying operation may occur at interface 360 of vehicle 310 rather than on a separate user device (e.g., device 395). In some embodiments, the control system 320 of the vehicle 310 obtains traffic, weather, and/or vehicle operating information through application programming interface (API) calls to third-party sources or from on-board vehicle sensors. In some embodiments, vehicle 310 need not receive information from, or otherwise communicate with, any user device (e.g., device 395 need not be included).

Figure 4:
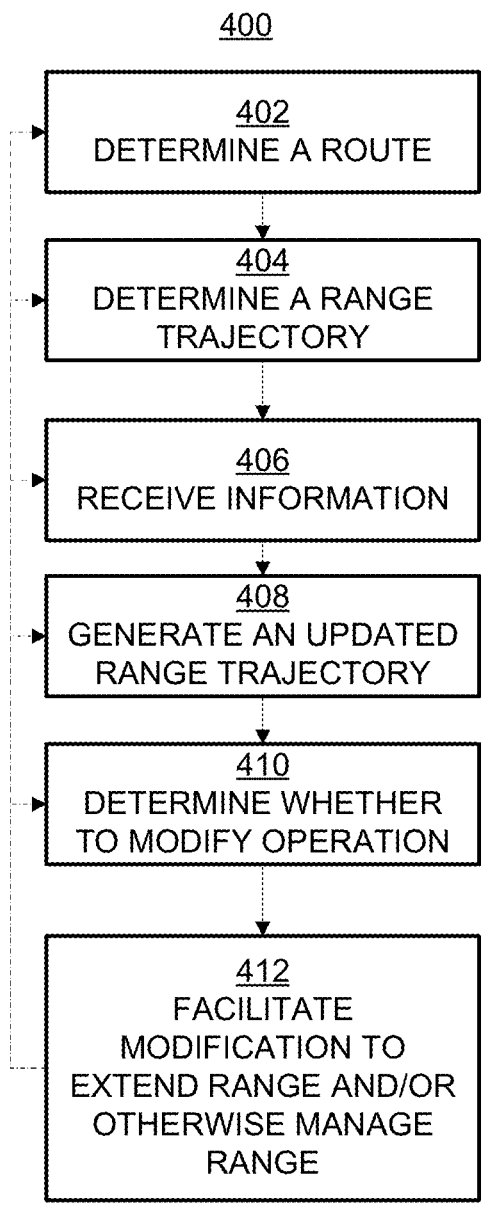
FIG. 4 is a flowchart of an illustrative process for managing an expected range, in accordance with some embodiments of the present disclosure.

FIG. 4 is a flowchart of illustrative process 400 for managing an expected range, in accordance with some embodiments of the present disclosure. Illustrative process 400 may be implemented by vehicle 101 of FIG. 1, vehicle 310 of FIG. 3, a control system thereof, or any other suitable system. For example, the illustrative steps of process 400 may be performed by control system 320 of vehicle 310 of FIG. 3.

Step 402 includes determining a route (e.g., to a destination, along a predetermined path). In some embodiments, the system determines a location of the vehicle (e.g., a current position), using GPS or other suitable technique. For example, in some embodiments, the system includes a vehicle tracking system. In some embodiments, the system determines the route by determining a current position of the vehicle and a destination (e.g., a target position), and then identifying a path between the current position and the target position. There may be a single destination or a plurality of destinations (e.g., including intermediate destinations, stops, or charging locations). For example, a route may include a piecewise collection of shorter routes that are combined (e.g., end to end). The route may be determined by the vehicle, a remote system (e.g., and communicated to the vehicle), a device (e.g., communicated to the vehicle), or a combination thereof. In some embodiments, step 402 may be omitted, and a route need not be predetermined for the vehicle to implement steps 404-412. For example, process 400 may be implemented without a predetermined route, and range may be managed in view of charging station locations, vehicle operation information (e.g., power consumption rate, vehicle system statuses, drive mode, HVAC settings, battery cooling settings, cabin settings, accessory settings), status information, user preferences, or a combination thereof.

Step 404 includes determining a range trajectory. The range trajectory includes one or more range-position data pairs. For example, a range trajectory may include a current position and a current range estimate (e.g., an estimate of achievable distance, or an estimated end of travel when power is depleted). In a further example, a range trajectory may include a set of range-position pairs, forming a curve (e.g., as shown by expected battery range 151 of FIG. 1). In some embodiments, the system determines a range trajectory (e.g., an expected range) based on a geographic route, terrain information, weather information, reference, or a combination thereof. In some embodiments, the range trajectory provides a reference trajectory that can be compared against future determinations of range to determine a deviation or change, which may be used to determine whether to modify operation of one or more vehicle systems.

Step 406 includes receiving information. The information may include status information, vehicle information (e.g., including vehicle operating information), reference information, traffic information, user preference information, any other suitable information, or any combination thereof. In some embodiments, information is pushed to the vehicle by another system (e.g., remote system 370, device 395). In some embodiments, the vehicle queries another system for information (e.g., remote system 370, device 395). In some embodiments, the vehicle determines information based on measurements, selections, calculations, reference information, or a combination thereof. In some embodiments, the vehicle receives status information while progressing along the route. For example, information may be received at a predetermined frequency (e.g., minute, hourly, daily) or at predetermined times (noon, midnight, or any suitable time of day). In a further example, the vehicle may query one or more information sources (e.g., via a network connection) at a predetermined frequency, at a predetermined time, or any other suitable time, and receive information in response. In a further example, the vehicle may receive information when a change arises, an event occurs, or otherwise not at predetermined times. To illustrate, if a storm along a route worsens, the vehicle may receive weather updates as they become available. In some embodiments, status information includes updates to information that may be used to update a range estimate and/or whether to facilitate modification of an electrical component of the one or more vehicle systems (e.g., vehicle systems 332).

Step 408 includes generating an updated range trajectory. For example, the system may modify the range trajectory of step 402 based on information received at step 406. As information is determined or received at step 406, the information may affect the range estimate. For example, high headwinds may lessen range, wet conditions may require increased traction (e.g., and accordingly power consumption), extreme temperatures may lead to increased HVAC usage to maintain cabin comfortability, or otherwise conditions may result in a reduced range (e.g., due to increased power consumption). In some embodiments, the vehicle determines range at predetermined times or at a predetermined frequency, and may update the range estimate at that time. While driving along the route will lessen range (e.g., power is consumed), the range at a particular location may deviate even further from an estimate based on driving conditions, weather, or other factors. Accordingly, the vehicle may determine a range trajectory that may include position-range pairs, a terminal point (e.g., along the route and corresponding to a range of zero), rate of consumption, any other suitable estimate of range over time or progress along the route, or any combination thereof.

Step 410 includes determining whether to modify operation of one or more vehicle systems based on the result of step 408. The vehicle may determine the updated range trajectory at step 408 and compare the update range trajectory with a reference trajectory and a threshold or reference value at a particular point (e.g., in time or position). In some embodiments, the vehicle may determine whether to modify the operation if the updated range trajectory (e.g., from step 408) differs from a reference trajectory (e.g., from step 404) by a predetermined amount. For example, as illustrated in FIG. 1, modified range estimate 153 may be generated or achieved based on a response of the vehicle to updated range estimate 152 (e.g., in the context of expected battery range 151).

Step 412 includes facilitating modification of an operating characteristic of one or more electrical components of each of the one or more vehicle systems. In some embodiments, step 412 includes modifying the operation of the one or more vehicle systems (e.g., of one or more vehicle systems 332 of FIG. 3) to extend range, otherwise manage range, or a combination thereof. For example, the one or more vehicle systems may include a cabin air system (e.g., the system may modify at least one cabin air setting). In a further example, the one or more vehicle systems may include a battery cooling system (e.g., the system may modify at least one battery cooling setting). In an illustrative example, the one or more vehicle systems are configured to operate based on a setpoint, and modifying the operation of one or more vehicle systems at step 412 includes modifying the setpoint to use less power. In some embodiments, a control system of the vehicle (e.g., control system 320 of FIG. 3) may cause the one or more vehicle systems to operate differently to adapt to weather updates, road condition updates, reduce power consumption, or a combination thereof. In some embodiments, the vehicle or control system thereof generates one or more control signals for reducing power consumption.

At any position along the route, the vehicle may update a previous range estimate to account for changes due to consumption, changing conditions, non-reference vehicle operation, or other circumstances that change an estimated range trajectory. For example, as illustrated in FIG. 1, updated range estimate 152 may be determined at step 408, based on deviations from expected battery range 151, which may be determined at step 404. In some embodiments, for example, a range trajectory includes a destination position or other intended future position (e.g., along the route), and the updated range trajectory includes an updated destination position or otherwise future position (e.g., at some reference SOC). For example, at a particular position, the vehicle may determine a destination D at step 404, and at step 408 the vehicle may determine that the range corresponds to a nearer point D' and thus does not extend to D (e.g., the range has been shortened).

In an illustrative example, the system may determine an expected range at step 404 for a route determined at step 402. The system may receive status information about the route at step 406, and determine a change from the expected range based on the status information at step 408. The system may then, in response to the updated range trajectory, modify operation of a vehicle system to compensate for the change at step 412 (e.g., steps 410 and 412 may be combined). In some embodiments, at step 408, the system determines the change from the expected range based on the status information of step 406 by determining an updated range based on the status information, and then comparing the expected range and the updated vehicle range. In some embodiments, the system modifies operation of the one or more vehicle systems by identifying the vehicle system based on reference information at step 410 and/or step 412, and identifying a modification the vehicle system based on the reference information at step 410 and/or step 412. In some embodiment, the system identifies a charging station having a location at step 402 or step 406, and modifies the operation of the one or more vehicle systems further based on the location of the charging station at step 412.

In an illustrative example, the system may determine an expected range at step 404 by determining a range trajectory based on the geographic route. The system may then determine a change in the expected range by identifying a deviation from the range trajectory based on an updated range estimate determined based on the status information at step 408. In some embodiments, the system updates the range trajectory based on modifying the operation of the one or more vehicle systems at step 412. For example, in some circumstances, as vehicle systems are modified, the range may be extended and the system may determine that modification is no longer needed.

In an illustrative example, referencing FIG. 1, control system 320 may, at step 402, determine route 102 based on a destination inputted by the user. At the beginning of the trip (e.g., at origin 00), control system 320 may estimate a current range (e.g., at step 404) that corresponds to P0 (e.g., taking into account information available to vehicle 101 at the time corresponding to origin 00). For example, control system 320 may initially determine that no modification is needed to reach the destination at T1, although control system 320 continues to monitor range and position to determine whether to suggest charging, whether to modify operation, or a combination thereof. As vehicle 101 progresses along route 102, it encounters snowstorm 106 around position W1. In some embodiments, vehicle 101 may receive status information (e.g., step 406) at some position between X1 and W1. In response to receiving the status information, vehicle 101 may be able to avoid relatively drastic, sudden, or otherwise more noticeable (to the occupant) modifications to extend range. For example, if vehicle 101 receives information (e.g., at step 406) about snowstorm 106 before or while encountering it, then vehicle 101 may identify the need to activate traction control, increase defrosting, decrease speed, recognize temperature-based changes in range, recognize traction-based changes in range, any other suitable changes in conditions or operation in response to conditions, or any combination thereof. In a further example, if vehicle 101 does not adapt to snowstorm 106 (e.g., does not begin modifying vehicle operation at M'), then the range of vehicle 101 may decrease, and vehicle 101 may determine to modify operation after-the fact, to attempt to reduce power consumption to make up for increased consumption from snowstorm 106. As illustrated by updated range estimate 152 in the vicinity of W1, the drop in estimated range due to changes in weather may ultimately lead to vehicle 101 not reaching charging station 105 (and accordingly the destination at T1) without recharging first. Vehicle 101 may determine to modify operation of one or more vehicle systems before, after, or during encountering snowstorm 106. As the one or more vehicle systems are modified (e.g., beginning at point M, as illustrated), the power consumption may be reduced, thus improving range as compared to updated range estimate 152. For example, modified range estimate 153 may be extended to be more consistent with expected battery range 151 if vehicle 101 can adapt sooner in the progress along route 102. Similarly, near position W2, vehicle 101 experiences another significant decrease in estimated range as exhibited by updated range estimate 152. Because vehicle 101 determined to modify operation at point M, vehicle 101 may more effectively respond to rainstorm 107. If vehicle 101 receives status information (e.g., step 406) about rainstorm 107, prior to reaching rainstorm 107, then vehicle 101 may begin modifying operation at point M to anticipate the effects of rainstorm 107. In an illustrative example, in the context of FIG. 1, the earlier in progress along route 102 that vehicle 101 receives status information at step 406, the earlier vehicle 101 can determine to modify operation of one or more vehicle systems such that the updated rang estimate more closely follows the initial range estimate. Further, by receiving status information earlier in progress along route 102, vehicle 101 can determine whether to suggest a charging event (e.g., to charger at charging station 105, or charge at charger 104 rather than charger 105). To illustrate, if vehicle 101 received status information that includes indications of snowstorm 106 and rainstorm 107, along with any other suitable information about route 102, then vehicle 101 may be able to modify during most or all of route 102 to ensure reaching the destination. If unforeseen events or conditions arise (e.g., information received after the trip has begun, while encountering the condition, or otherwise not in advance), vehicle 101 can adapt in response to the changing conditions.

In an illustrative example, referencing FIG. 2, the vehicle or control system thereof may determine route 201 at step 402 based on selecting points (e.g., a starting point and an ending point) on a map application (e.g., using interface 360 of FIG. 3). Vehicle may determine a range estimate at step 404, which may be based on route 201 or may be independent of route 201 (e.g., based on an estimated power consumption rate). The vehicle may manage the range by determining the distance to one or more chargers (e.g., identified as C1 or C2), a current range estimate (e.g., as compared to a reference range), differences between the range estimate and other metrics (e.g., distance to chargers, deviations from the reference), or a combination thereof along route 201. The vehicle may also receive status information, determine vehicle information, determine route information, retrieve reference information, or a combination thereof at step 406 along route 201 and update the range estimate along route 201 at step 408. Also, along route 201, the vehicle may determine whether to modify operation of one or more vehicle systems at step 410 based on the range metrics. If the vehicle modifies operation of one or more vehicle systems at step 412, the vehicle may continue to monitor the rang estimate, distance to charger, reference range, differences therebetween, and/or any other suitable information to determine whether to continue modifying operation, further modify operation (e.g., cause greater or lesser changes in operation), or cease modifying operation (e.g., if power has been sufficiently conserved to result in a sufficient range).

In an illustrative example, referencing FIG. 3, control system 320 may determine a route or collection of routes at step 402, based at least in part on map information (also referred to as route information) from remote system 370. Control system 320 may determine a range trajectory at step 404 by retrieving terrain information (e.g., which may be included in the map information), traffic information (e.g., which may be included in the map information), expected performance of vehicle 310, and any other suitable information. As vehicle 310 drives, control system 320 may update the range estimate (e.g., at step 408), and if the range estimate is within a distance threshold of a nearest or otherwise selected charger, or greater than a distance threshold from a destination, then control system 320 may determine to modify one or more of vehicle systems 332.

In another illustrative example, referencing FIG. 3, control system 320 need not determine a route at step 402 to manage vehicle range. Control system 320 may determine a range estimate at step 404 by retrieving terrain information (e.g., which may be included in the map information), traffic information (e.g., which may be included in the map information), expected performance of vehicle 310, and any other suitable information, without having an intended destination or path. As vehicle 310 drives, control system 320 may update the range estimate (e.g., at step 408), and if the range estimate is within a distance threshold of a nearest or otherwise selected charger, then control system 320 may determine to modify one or more of vehicle systems 332. Accordingly, during driving without an inputted route, control system 320 can manage range by modifying vehicle operation to ensure that vehicle 310 can reach at least one charger or other designated location (e.g., with the SOC above some predetermined threshold). For example, if a route is not specified, then control system 320 may receive information based on a current location of vehicle 310 (e.g., as determined by a GPS system of control circuitry 321 or range manager 326).

In an illustrative example, at step 412, the system may automatically facilitate modification of an operating characteristic of one or more electrical components of the one or more vehicle systems 332 (e.g., of vehicle system(s) 332). In some embodiments, facilitating modification of the operating characteristic is performed by one or more ECUs of the vehicle (e.g., of control circuitry 321). Modification could be accomplished automatically or after providing a notification to the user (e.g., via the user interface of a central information display, driver instrument panel, or application executing on the user's mobile device) of a potential modification and receiving an indication of a user's desire to accept that modification to the vehicle operating condition. The electrical components may include motors, fans (e.g., having electric motors), compressors (e.g., having electric motors), ohmic devices (e.g., heaters), thermoelectric devices (e.g., coolers), power electronics (e.g., IGBTS, diodes, switches, busbars), actuators, screens (e.g., a of a console), lighting (e.g., LEDs), accessories (e.g., DC loads), any other suitable components, or any combination thereof. An operating characteristic may be directly or indirectly governed by the electrical component. For example, the operating characteristic may include a ride height setting or other setting that affects aerodynamic drag and thus motor current), a pedal map that affects maximum torque and thus motor current, an HVAC temperature that may depend on compressor speed and thus a motor current, a cooling system temperature that may depend on a pump speed and thus a motor current, a temperature of a seat heater/cooler that may correspond to a current draw, any other suitable operating characteristic, or any combination thereof. In an illustrative example, at step 412, the system may reduce an air conditioning power (e.g., set a setpoint nearer to the environmental temperature to reduce cooling) if the driver is driving faster than expected along the route in order to minimize charging stops. Further, at step 412, the system may change a driving mode to provide tighter traction and suspension control based on wet or bumpy terrain, and update the estimated range accordingly.

In some embodiments, facilitating the modification includes generating and sending an instruction to modify a setpoint, modify a state (e.g., turn ON, OFF, STANDBY, or other suitable state), modify a measured quantity (e.g., modify current, torque, power, heat, temperature difference, or other quantity) that depends on the operating characteristic, causing any other suitable modification, or any combination thereof. For example, in some embodiments, facilitating the modification includes communicating a threshold, maximum value of a setpoint, minimum value of setpoint, or otherwise operating information to a subsystem, controller (e.g., an ECU configured to manage the vehicle system or electrical components thereof), component, or combination thereof. In a further example, facilitating the modification may include causing a modification to a current (e.g., reducing a phase current in a motor, reducing a current, reducing a shaft speed), modifying a component to lessen aerodynamic drag (e.g., which in turn lessens motor current), consumption rate of other devices (e.g., brightness of screens), or a combination thereof. In a further example, an ECU may send an instruction (e.g., to an HVAC system), change a setting (e.g., in memory), or a combination thereof. In some embodiments, facilitating the modification may include sending an instruction to reduce power consumption (e.g., reduce HVAC load by 10 watts, modify a setpoint to be less aggressive) and an ECU associated with the vehicle system may determine which settings to adjust to reduce power consumption. In some embodiments, a range manager may send an instruction to an HVAC controller to reduce HVAC consumption by a predetermined amount (e.g., which may be based on a deviation in range estimate, estimated range, or other range metric), and the HVAC controller may determine whether to modify setpoints, disable functionality (e.g., turn OFF or limit air conditioning, limit fan speed, limit compressor speed), or otherwise reduce consumption. In some embodiments, step 412 includes changing reference information stored in memory such as, for example, threshold values, setpoints, gains, parameter values, limits, or other suitable values that affect operating characteristics of the electrical components of one or more vehicle systems.

In an illustrative example, the system may determine a change in the range trajectory based on status information, and retrieve one or more change criteria to determine whether to modify operation. For example, a change criterion may include a change threshold, a set of intervals of changes such that greater changes are indexed separate from lesser changes, or other suitable criteria. The system may compare calculated change in range trajectory with the change criterion to determine whether to modify operation (e.g., greater changes are more likely to require modification, while lesser changes need not necessarily induce modification). In a further example, the system may determine a range and compare to one or more range criteria, in addition to or rather than a change. For example, if an estimated range is below a threshold range of the range criteria, then the system may determine to facilitate modification to operating characteristics of one or more electrical components of the one or more vehicle systems.

Figure 5:
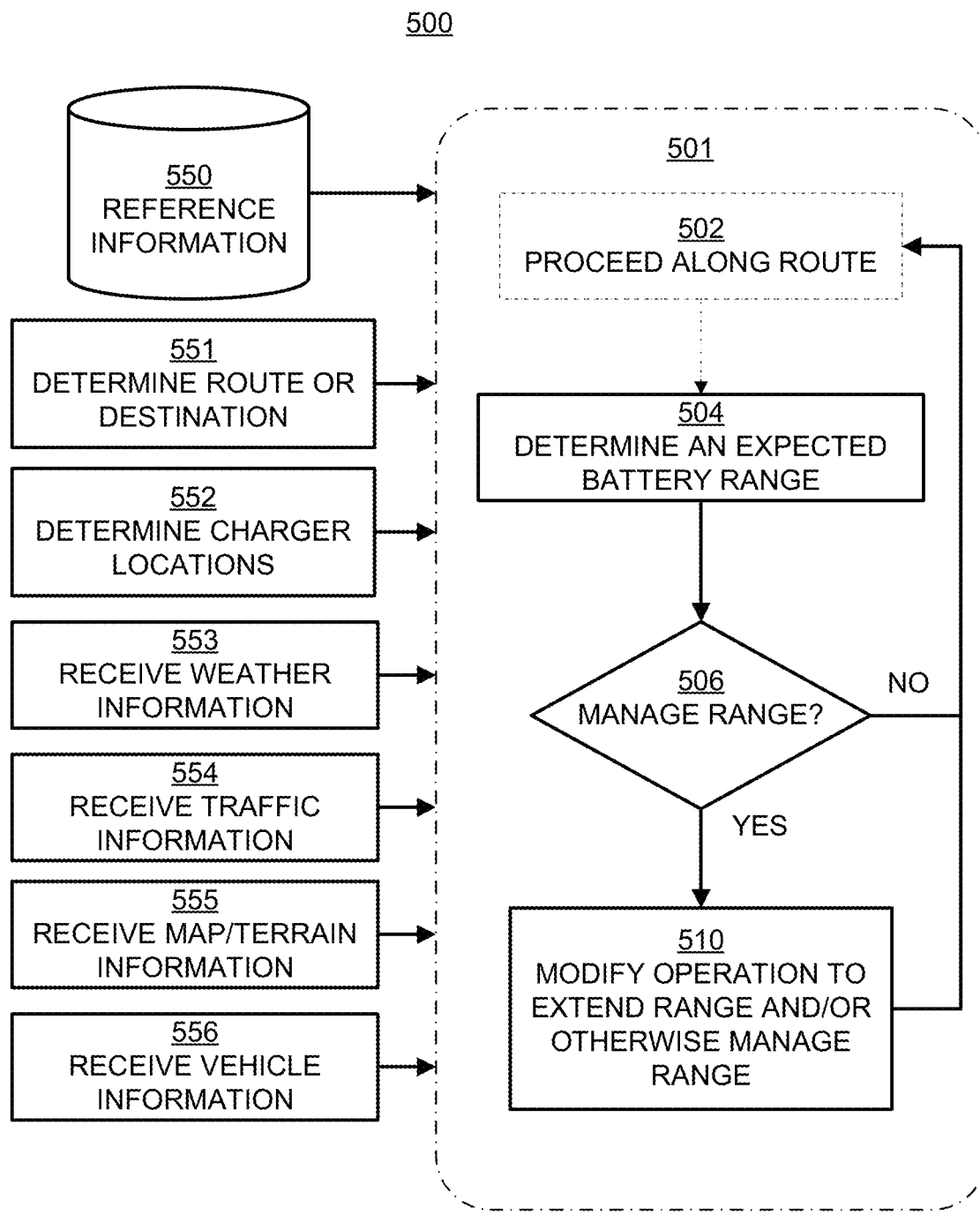
FIG. 5 is a flowchart of an illustrative process for managing an expected range as status information is received, in accordance with some embodiments of the present disclosure.

FIG. 5 is a flowchart of illustrative process 500 for managing an expected range as status information is received, in accordance with some embodiments of the present disclosure. Illustrative process 500 may be implemented by vehicle 101 of FIG. 1, vehicle 310 of FIG. 3, a control system thereof, or any other suitable system. For example, the illustrative steps of process 500 may be performed by control system 320 of vehicle 310 of FIG. 3. As illustrated, the vehicle performs (e.g., repeats) process 501, and may receive information at steps 551-556 to help in determining whether to update a range estimate, modify operation to extend range, or a combination thereof.

Step 501 includes the vehicle proceeding along a route, which may be predetermined or may merely refer to the path the vehicle motion achieves (e.g., the route is not preprogrammed or known). As the vehicle proceeds, the vehicle consumes power (e.g., from an energy source such as a battery system), which lessens the potential range the vehicle can achieve (e.g., lessens the accumulated energy available to provide power during vehicle operation). Accordingly, process 501 may be performed with or without a predetermined route.

Step 551, which may be same as or similar to step 402 of process 400, includes determining a route, destination thereto, or both. In some embodiments, the system determines a location of the vehicle (e.g., a current position), a destination (e.g., an intended position to achieve at a future time), or both using GPS or other suitable technique. For example, in some embodiments, the system includes a vehicle tracking system. In some embodiments, the system determines the route by determining a current position of the vehicle and a destination, and then identifying a path between the current position and the target position. The route may be determined by the vehicle, a remote system, a device, or a combination thereof. In some embodiments, step 551 may be omitted, and a route need not be predetermined.

Step 504 includes the vehicle determining an expected battery range (e.g., an estimated range such as a range trajectory of one or more points). The vehicle may determine the expected battery range based on, for example, route information (e.g., based on steps 551 and 555), charger information (e.g., based on step 552), status information (e.g., based on step 553), traffic information (e.g., based on steps 551, 554, and/or 555), vehicle information (e.g., based on step 556), reference information 550, any other suitable information, or any combination thereof. For example, the vehicle may determine an estimated distance the vehicle could travel based on historic power consumption rates, an average power consumption rate, terrain steepness, environmental temperature, weather conditions (e.g., traction, precipitation, wind), road conditions, observed or expected traffic, a current state of charge, current HVAC settings, current drivetrain settings, current cooling or heating settings, any other suitable information, or any combination thereof.

Step 506 includes the vehicle determining whether to manage the range of the vehicle. For example, if the expected battery range of step 504 is relatively large compared to the distance to one or more chargers, then the vehicle may determine that managing range is not needed (e.g., there is no need to conserve power as the risk of running out of battery power is low). In a further example, the vehicle may determine at step 506 that based on the estimated range of step 504 and either the lack of proximity of chargers or preference to limit or avoid unnecessary charging events, to manage the range of the vehicle. In a further example, at step 506, the vehicle may determine whether to manage the range based on user input (e.g., to interface 360), selecting or otherwise indicating that management is desired or not. If the user is running errands near home and is not anxious about range then they may opt for no range management, while when undertaking uncertain or longer trips (or more anxious drivers), the user may opt for range management. In some embodiments, step 506 includes determining whether to provide a notification to the user, indicate or update a recommended charger (e.g., a closer charger within the estimated range), or a combination thereof.

Step 510 includes the vehicle modifying operation of one or more vehicle systems (e.g., vehicle system(s) 332 of FIG. 3) to extend range and/or otherwise manage range, if determined at step 506. In some embodiments, steps 506 and 510 may be combined, in which the vehicle determines to modify operation of the one or more vehicle systems based on the rang estimate and any other suitable information. In some embodiments, step 510 is the same as or similar to step 412 of process 400. The one or more vehicle systems may include a cabin air system (e.g., air conditioning, heating, defrosting, defogging, seat heating/cooling), battery cooling system, drivetrain system (e.g., heating, cooling, torque control, traction control), vehicle control (e.g., an ADAS system, suspension system, steering system), any other suitable system, or any combination thereof. In some embodiments, step 510 includes balancing a plurality of electrical loads such that the total power consumption is within a predetermined ranged (e.g., less than a nominal value or reference value). In some embodiments, for example, the system may determine that one system is likely to require more power (e.g., wet roads and rainy conditions may require four-wheel drive and defogging), and accordingly manage range by modifying power consumption of other systems (e.g., limiting top speed, reducing comfort-based HVAC operation, reducing power to accessories). To illustrate, the system may determine a power threshold, and based on a set of preferences (e.g., hierarchy or ranking of systems, which may be provided by the user or reference information), determine operation of which vehicle systems to modify and how much to modify. In some embodiments, step 510 includes providing a notification to the user (e.g., indicating the modification, updated range estimate, or both), to indicate or update a recommended charger (e.g., a closer charger within the estimated range), provide any other suitable information to the user, or any combination thereof.

During process 501, the vehicle may receive or otherwise determine information as it occurs, as it is transmitted, as it is requested, or a combination thereof. The information may include upcoming or expected events (e.g., storms, road closures), location-specific conditions (e.g., localized storms or weather, traffic, road conditions), updates to existing information or estimates, any other suitable information, or any combination thereof. To illustrate, the vehicle may determine whether to manage range at step 506 in response to receiving information, or may take into account previously received information (e.g., making the determination of step 506 after receiving the information, at some subsequent time). For example, if the vehicle can decide to manage range sooner, the vehicle may be able to extend or maintain range without as significant of modifications to the operating characteristics of the vehicle system or electrical components thereof.

Step 552 includes the vehicle determining one or more charger locations. In some embodiments, the vehicle determines its own location and then searches for charging stations within some predetermined distance (e.g., which may be based on the estimated range). In some embodiments, the vehicle identifies a plurality of chargers (e.g., in an area, region, city, county, state, etc.) and then determines a subset of the charging stations as being relevant for charging the vehicle. In some embodiments, the vehicle determines an identifier for each charging station (e.g., an ID to index the charging stations), a charging capacity, operating hours, operating limits, special requirements for access, payment information, any other suitable information, or any combination thereof at step 552.

Step 553 includes the vehicle receiving weather information from one or more information sources (e.g., remote system 370). Weather information may include positions and/or times of storm activity (e.g., a measured or forecasted region and time range), storm events or patterns, wind direction and magnitude, environmental temperature, environmental humidity, barometric pressure, any other suitable information about weather or the environment, or any combination thereof (e.g., wind chill factor). Weather information may be updated in time (e.g., during process 501), and accordingly, step 553 may be performed repeatedly, at a predetermined frequency, in response to a query (e.g., from the vehicle), in response to an event or change in conditions, any other suitable criterion, or any combination thereof. For example, if a known storm worsens (e.g., temperatures, wind speeds, or precipitation become or are forecasted to become more extreme), updates to weather information may be provided at step 553. To illustrate, in some circumstances, the earlier that step 553 is performed, the earlier the vehicle can manage range to adapt to the changing conditions.

Step 554 includes the vehicle receiving traffic information. Traffic information may include actual or expected road closures, areas of slow speed (e.g., traffic jams), long wait times, reduced numbers of lanes, absence of a road shoulder, detours (e.g., alterations to a route determined at step 551), any other suitable information, or any combination thereof. For example, traffic information may be based on measurements, historical data (e.g., statistically processed, or processed with artificial intelligence techniques), forecasts, or a combination thereof.

Step 555 includes the vehicle receiving map information, which may include terrain information. Map information may include for example, roads, exits, intersections, geographic features, elevation information, road types (e.g., material type, paved or unpaved, number of lanes, speed limit), any other suitable information, or any combination thereof. In some embodiments, steps 551 and 555 may be combined, and a route may be determined based on map information. In some embodiments, the vehicle may use map information to generate a range estimate.

Step 556 includes the vehicle receiving vehicle information. Vehicle information may include, for example, vehicle operating characteristics/information such as power consumption rate, vehicle system settings, historical vehicle data, drive mode, vehicle systems that are enabled/disabled, operation limits (e.g., speed limits, current limits, torque limits, temperature limits), any other suitable information, or any combination thereof. In some embodiments, vehicle information includes vehicle identification information such as, for example, a VIN number, license number, vehicle type (e.g., make, model, package, selected options), or other information. In some embodiments, vehicle operating information includes fault information such as, for example, systems that are offline, malfunctioning, or otherwise not functioning as intended (e.g., as compared to reference or expected operation). In some embodiments, vehicle information may include occupant information such as, for example, which persons are in the vehicle, who is driving, user preference information (e.g., which systems are preferred for modification to extend range), historical user driving data, any other suitable information, or any combination thereof.

In an illustrative example, the system may determine a route at step 551, locate a position of a charging station along the route at step 552, and then proceed along the route at step 502. Process 501 may include the system repeatedly (a) receive information while progressing along the route (e.g., any or all of steps 553-556), (b) update the range estimate based on the information at step 504, and (c) at step 510, determine a modification to operation of one or more vehicle systems based on the range estimate and the position of the charging station. In some embodiments, the system determines the modification at step 510 by determining a difference between the range estimate (e.g., of step 504) and an updated range estimate (e.g., of a subsequent implementation of step 504 at a later time), determining whether to modify the operation of the one or more vehicle systems based on the difference and based on reference information, and identifying the one or more vehicle systems based on the reference information. Process 501 may be repeated while the vehicle is occupied or being driven, and information may be received at a predetermined frequency, intermittently, in response to an event, in response to a request, or at any other suitable time.

In an illustrative example, the system may implement process 501 as an adaptive mode that actively monitors and/or manages range of the vehicle. In some embodiments, for example, the user may select a "range management" mode. For example, the system may determine (e.g., estimate) the range available (e.g., at step 504), determine a distance to one or more charging locations at step 552 (e.g., a nearest charger location), determine ambient conditions at step 553, and determine road conditions at step 555 to manage range and reduce range anxiety of the driver. The system may repeat the range management steps, while receiving further information as it is available. In a further example, during process 500, the system may scan the road ahead for weather and terrain using GPS navigation data at steps 553, 554, and 555. In a further example, during process 500 (e.g., at step 506), the system may check the available range of step 504 and the distance to nearest charger as determined at step 552, and maximize or otherwise extend the range by automatically taking action at step 510.

In an illustrative example, a driver may start with a destination set in GPS of vehicle, as determined at step 551. While proceeding at step 502 along the route, the driver may be faced with severe cold, rain, or heat, and may use more power for HVAC and battery cooling than under less severe weather conditions (e.g., HVAC may reduce range significantly). The system manages ride height and drive mode to account for weather conditions, but may modify operation of other systems to reduce overall power consumption. For example, operation of the vehicle with adjustable ride height or with four-wheel drive during a route may affect range and may need to be accounted for to improve range. Without range management, the driver must determine when to charge a vehicle and how close they are to a charging station, and the range anxiety of the driver may increase. By managing range, the system may also manage range anxiety. For example, an adaptive driving mode may be enabled, which may provide weather adaptability, terrain adaptability, or a combination thereof to provide functionality while managing power consumption rates. The system may provide weather adaptability by checking the weather along the route at step 553, checking the available range and the distance to the next charging station, and taking action to maximize, increase, or otherwise maintain vehicle range. The action may include, for example, reducing the magnitude of an AC setpoint for bare minimum comfort (e.g., the setpoint results in less air conditioning power), turning OFF seat heating and/or cooling, reducing battery heating/cooling, reducing powertrain heating/cooling, enabling ADAS controls for lane departure and driving mode, changing a front/rear torque split, enabling automatic defog/defrost, performing any other suitable action, or any combination thereof. The system may provide terrain adaptability by checking terrain in current driving conditions (e.g., road types, road surface conditions, roughness, visibility), reducing ride height if not required for the terrain, changing driving mode to two-wheel to reduce power and back to four-wheel in rough terrain conditions, changing a front/rear torque split, performing any other suitable action, or any combination thereof. The system may provide charging event predictability by estimating the distance to a charger, determining a consumption rate, suggesting a charging event time and/or location to the driver, determining a charging frequency, determining a SOC threshold for charging (e.g., do not let SOC fall below 30%, 25%, 20%), any other suitable action, or any combination thereof.

Figure 6:
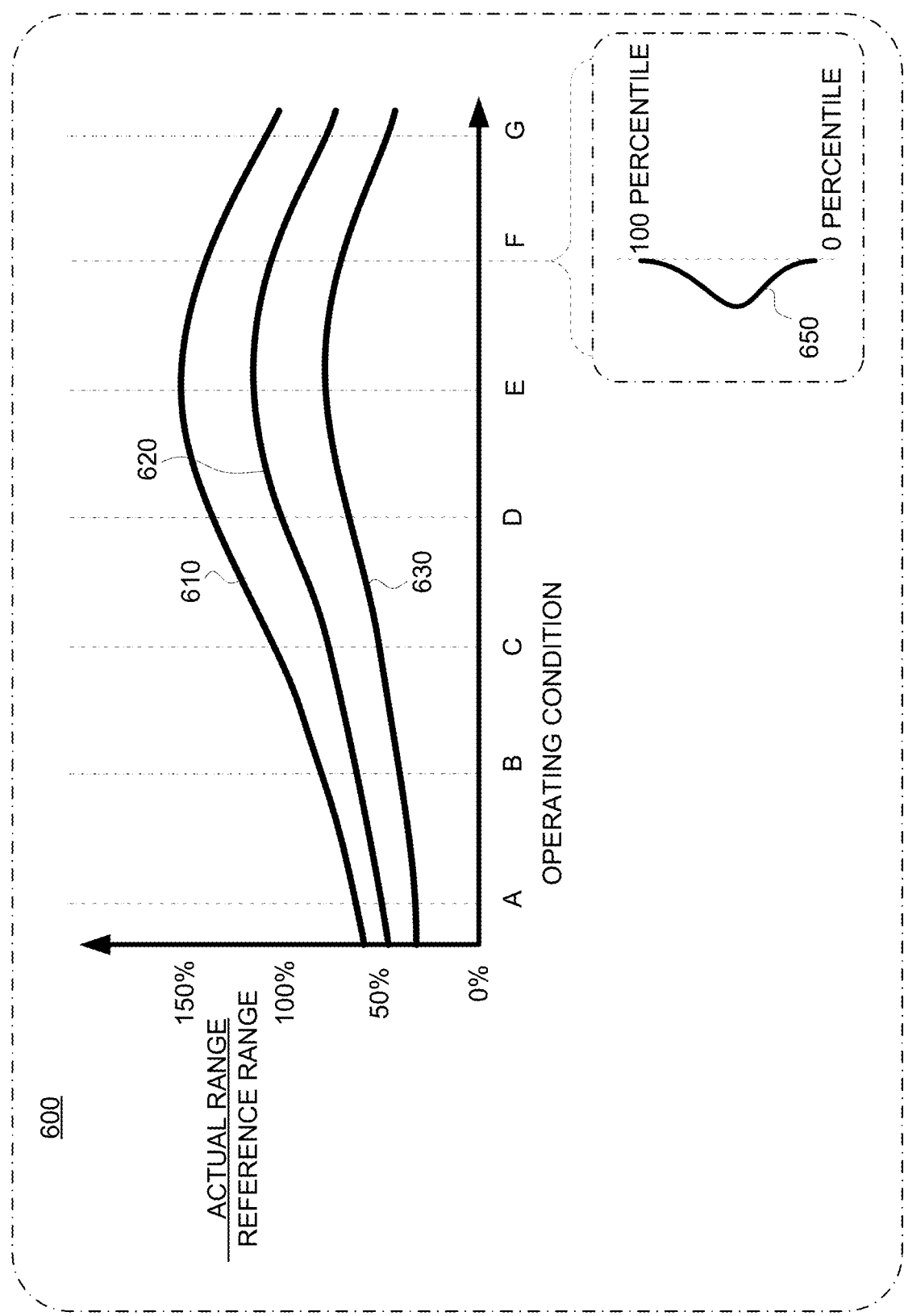
FIG. 6 shows an illustrative plot of range as a function of operating condition, in accordance with some embodiments of the present disclosure.

FIG. 6 shows illustrative plot 600 of range as a function of operating condition, in accordance with some embodiments of the present disclosure. Operating condition may include, for example, environmental temperature (e.g., in which the vehicle operates), humidity, elevation, wind (e.g., direction and/or speed of wind), precipitation, vehicle speed, any other suitable condition or operating characteristic, or any combination thereof. Identifiers A-G corresponding to values of the operating condition (e.g., increasing in the direction of the axis arrow). Trace 610 is a $90^{th}$ percentile ratio, trace 620 is a $50^{th}$ percentile ratio, and trace 630 is a $10^{th}$ percentile ratio, with trace 650 representing a vertical distribution at a particular operation condition value (at operating condition F, trace 650 is the distribution of achieved ranges, measured or estimated). As illustrated, the operating condition may be an environmental temperature, for which a maximum range occurs near point E (e.g., between points E and F, nearer to E, which may be about 20° C.) and decreases as temperatures decrease below that at point E or increase above that at point E. For example, as ambient temperatures become colder (e.g., points D-A), actual range decreases, independent of other variables. Further, as ambient temperatures become hotter (e.g., points F-G), range decreases, independent of other variables. If ambient temperature increased to point G, and a driver increased HVAC usage (e.g., lowering an air-conditioning temperature setpoint), and the driver applied greater peak accelerations, then range would decrease even more than illustrated in plot 600.

In some embodiments, reference information may include range estimates, statistical information (e.g., as shown by traces 610, 620, 630, and 650), actual ranges achieved (e.g., ensemble data from many vehicles under many conditions), any other suitable information, or a combination thereof. For example, reference information may include information about a plurality of operating conditions, such that for a particular set of operating conditions, a range estimate may be generated that takes into account the plurality of operating conditions. To illustrate, for a particular environmental temperature, road type, and driving mode (e.g., two-wheel or four-wheel), a range may be estimated or updated based on the reference information.

Figure 7:
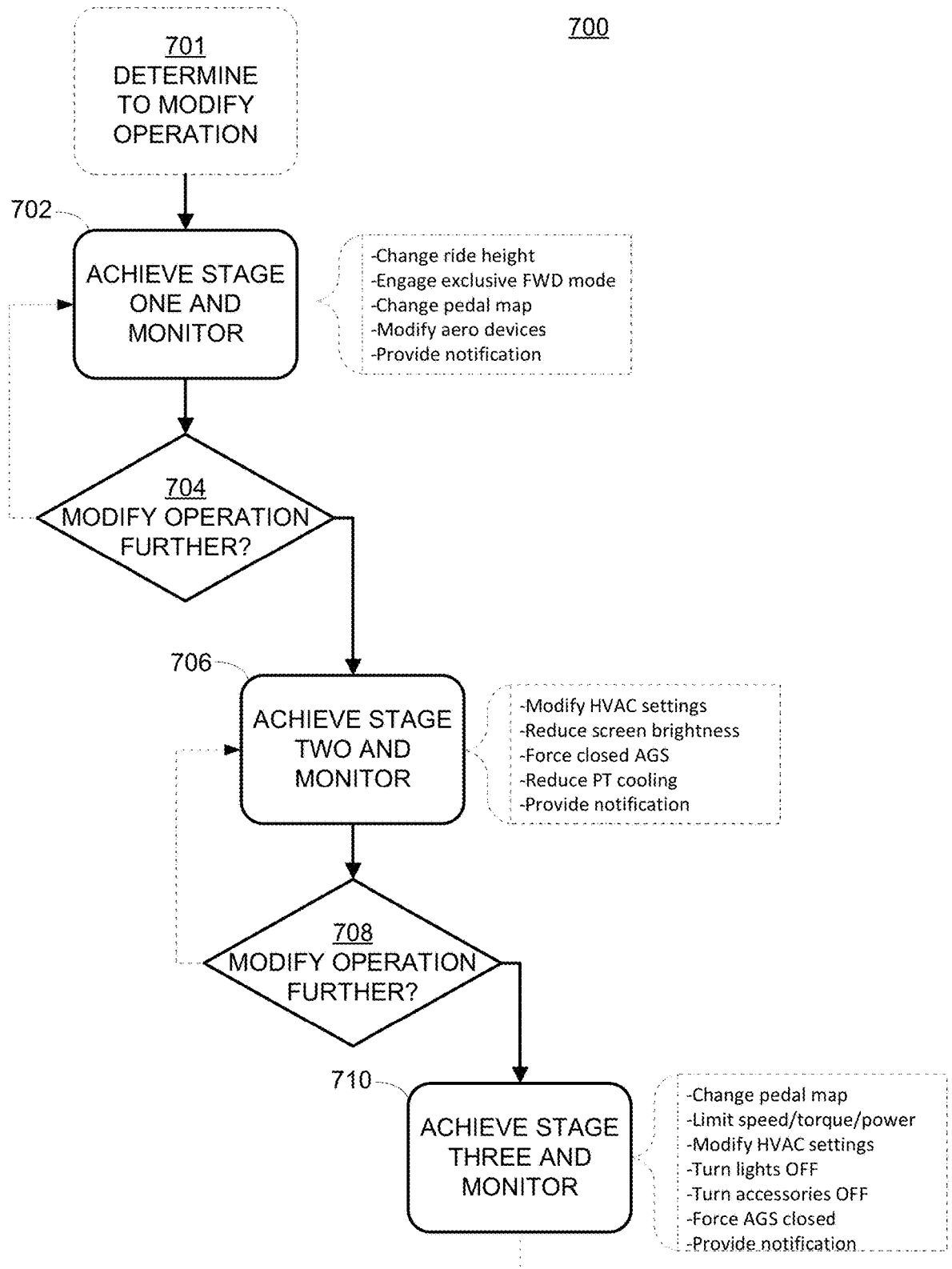
FIG. 7 is a flowchart of an illustrative process for managing an expected range using staged modifications, in accordance with some embodiments of the present disclosure.

FIG. 7 is a flowchart of illustrative process 700 for managing an expected range using staged modifications, in accordance with some embodiments of the present disclosure. As illustrated, process 700 shows three stages of modification, although it will be understood that any suitable number of stages may be used in accordance with the present disclosure (e.g., one stage, two stages, more than three stages, a plurality of stages). Illustrative process 700 may be implemented by vehicle 101 of FIG. 1, vehicle 310 of FIG. 3, a control system thereof, or any other suitable system. For example, the illustrative steps of process 700 may be performed by control system 320 of vehicle 310 of FIG. 3. In a further example, while the vehicle performs process 700, the vehicle may receive information to help in determining whether to update a range estimate, determine a stage of modification to operation to extend range, or a combination thereof. As illustrated, steps 702, 706, and 710 include the system facilitating modification of one or more operating characteristics of electrical components of one or more vehicle systems. The operating characteristics may include, for example, an aerodynamic characteristic (e.g., ride height, or a setting of a vent, grill, spoiler, vanes, or other components), a pedal map, a drive mode, HVAC setting (e.g., a temperature, a temperature difference, a fan speed, a compressor speed, an amount of heat transferred), cooling setting (e.g., a coolant flow rate, a temperature, a temperature difference, an amount of heat transferred, a coolant path), brightness of a screen or light, ON/OFF state or consumption limit of an accessory, any other suitable characteristic, or any combination thereof. The electrical component may include a motor (e.g., a drive motor, a fan motor, a compressor motor), power electronics, heaters, actuators (e.g., for adjusting ride height or other adjustment affecting aerodynamic drag), a screen, a light, a speaker, any other suitable component, or any combination thereof.

Step 701 includes determining to modify operation of one or more vehicle systems based on a change in expected range, as determined by considering status information. For example, step 701 may be the same as or similar to step 410 of process 400, or determining "YES" at step 506 of process 500. If an estimated range has been reduced based on status information, the system may determine at step 701 that modifications need to be facilitated to reduce consumption to extend range.

Step 702 includes achieving Stage One (S1) and continuing to monitor an expected range. S1 may include a reduction in driving comfort, slight performance impact, any other suitable slight modification, or any combination thereof. When the system determines to modify operation, the system may achieve stage one modification, which corresponds to less significant modifications to less critical systems, and then monitors the range. S1 operation may include, for example, changes in ride height, changes to drive mode (e.g., engaging front-wheel drive rather than rear-wheel or four-wheel drive), changing a pedal map (e.g., for less aggressive acceleration, lesser torque, lesser top speed or both), modifying aerodynamic devices (e.g., such as spoilers vents, fins) to reduce drag (e.g., to reduce consumption), provide a notification to the driver (e.g., at interface 360) that range is being managed (e.g., according to S1), any other suitable modification or action, or any combination thereof. In some embodiments, S2 may be sub-staged, with the system modifying operation of one or several vehicle systems at a time, sequentially until the range is improved.

Step 704 includes determining whether to modify operation of one or more vehicle systems further based on a change in expected range or other suitable metric. If operation in S1 is sufficient to increase, maintain, or otherwise achieve a range that greater than a threshold, greater than a distance to a charger (e.g., by a threshold such as 20 units or 50 units), greater than a distance to a destination (e.g., by a threshold such 20 units or 50 units), or other sufficient to cause the system to cease modifying operation of the one or more vehicle systems.

Step 706 includes achieving Stage Two (S2) and continuing to monitor an expected range. S2 may include a reduction in driving comfort, reduction in vehicle performance, any other suitable modification, or any combination thereof. When the system determines to modify operation further, the system may achieve S2 modification, which corresponds to relatively more significant modifications as compared to S1, and then monitors the range. S2 operation may include, for example, changes in HVAC mode or settings (e.g., activate an eco-mode), reduce screen brightness (e.g., of interface 360), close an active grill shutter (AGS) to reduce drag, reduce powertrain cooling (e.g., cooling performance, which may affect maximum current, maximum torque or other performance characteristics), provide a notification to the driver (e.g., at interface 360) that range is being managed (e.g., according to S2), any other suitable modification or action, or any combination thereof. In some embodiments, S2 may be sub-staged, with the system modifying operation of one or several vehicle systems at a time, sequentially until the range is improved.

Step 708 includes determining whether to modify operation of one or more vehicle systems further based on a change in expected range or other suitable metric. If operation in S2 is sufficient to increase, maintain, or otherwise achieve a range that greater than a threshold, greater than a distance to a charger (e.g., by a threshold such as 20 units or 50 units), greater than a distance to a destination (e.g., by a threshold such 20 units or 50 units), or other sufficient range to cause the system to cease modifying operation of the one or more vehicle systems, or optionally return to operation in S1.

Step 710 includes achieving Stage Three (S3) and continuing to monitor an expected range. S3 may include achieving a minimal or otherwise significantly reduced energy usage condition, any other suitable significant modification, or any combination thereof. When the system determines to modify operation still further, the system may achieve S3 modification, which corresponds to even more significant modifications as compared to S2, and then monitors the range. S3 operation may include, for example, changing a pedal map to a limited power mode (e.g., further reducing peak speed, current, and/or torque), limiting top vehicle speed, reducing HVAC performance to a minimum or severely reduced level (e.g., turning OFF or otherwise limiting the magnitude of changes the HVAC system can bring about), turning some or all lights off (e.g., a subset of non-legally required lights), turning OFF accessories (e.g., chargers, cabin interior lights, audio system, graphics system), close the AGS, provide a notification to the driver (e.g., at interface 360) that range is being managed (e.g., according to S3), any other suitable modification or action, or any combination thereof. In some embodiments, S3 may be sub-staged, with the system modifying operation of one or several vehicle systems at a time, sequentially until the range is improved.

It will be understood that the system may implement any of Stages disclosed herein, any other Stages (e.g., which may be modified or altered as compared to S1, S2, or S3), in any suitable order, sequentially or simultaneously, in accordance with the present disclosure.

The illustrative steps of processes 400, 500, and 700 may be combined, omitted, or otherwise modified, in accordance with the present disclosure. For example, process 700 may be an example of step 412 of process 400, or step 510 of process 500.

In an illustrative example, facilitating the modification of the operating characteristic includes facilitating a modification from a first setting (e.g., an original setting) to a modified setting at any or all of steps 702, 706, and 710. The system may monitor the operating characteristic of one or more electrical components, determine a change from the expected range by updating the expected range based on the status information and based on monitoring the operating characteristic, and determine to return to the first setting based on updating the expected range. In some embodiments, if sufficient power has been conserved and range is sufficiently extended, the system may determine cease modifying operation to conserve power and return to "normal" operation, less-limited operation, or otherwise less restrictive operation. To illustrate, during modification, a setpoint may be lessened, and when range has been sufficiently extended, the setpoint may be increased to an original limit, a relatively increased limit from that of modified operation, or otherwise modified to be less restrictive.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:
   determining, using control circuitry, an expected battery range of a vehicle for a route to a destination;
   receiving status information associated with environmental conditions along the route;
   determining, using the control circuitry, a change from the expected battery range based on the status information;
   determining, from a plurality of modification stages, a modification stage based on the change, wherein:
   the plurality of modification stages comprises a first modification stage and a second modification stage; and
   the first modification stage modifies a first vehicle system and the second modification stage modifies a second vehicle system; and
   modifying, using the control circuitry, an operating characteristic of one or more electrical components of a vehicle system corresponding to the determined modification stage to compensate for the change.

2. The method of claim 1, further comprising determining whether to modify the operating characteristic of the one or more electrical based on a change criterion, wherein modifying the operating characteristic comprises:
   identifying the vehicle system based on reference information; and
   identifying a modification based on the change.

3. The method of claim 1, wherein determining the change based on the status information comprises:
   determining an updated battery range based on the status information; and
   comparing the expected battery range and the updated battery range.

4. The method of claim 1, further comprising:
   identifying a charging station having a location, wherein:
   modifying the operating characteristic is further based on the location of the charging station.

5. The method of claim 1, wherein the vehicle system comprises one of:
   a cabin air system, and wherein modifying the operating characteristic comprises modifying at least one cabin air setting; or a battery cooling system, and wherein modifying the operating characteristic comprises modifying at least one battery cooling setting, and wherein:
   the vehicle system is configured to operate based on a setpoint; and
   modifying the operating characteristic comprises modifying the setpoint to cause the one or more electrical components to use less power.

6. The method of claim 1, wherein:
   determining the expected battery range comprises determining a range trajectory at a first time based on the route, wherein the range trajectory comprises a plurality of battery range estimates from a current location to the destination; and
   determining the change comprises identifying a deviation from the range trajectory based on an updated range trajectory determined at a second time based on the status information.

7. The method of claim 1, wherein the modifying the operating characteristic is from a first setting to a modified setting, the method further comprising:
   monitoring the operating characteristic;
   determining the change by updating the expected battery range based on the status information and based on monitoring the operating characteristic; and
   determining to return to the first setting based on updating the expected battery range.

8. A method for managing range of a vehicle, the method comprising:
   locating, using control circuitry, a position of a charging station; and
   repeating, using the control circuitry, at least once:

(a) receiving status information associated with environmental conditions while the vehicle is in operation;
(b) updating an expected battery range based on an operating condition of the vehicle or on the status information;
(c) determining, from a plurality of modification stages, a modification stage based on the expected battery range, wherein:
the plurality of modification stages comprises a first modification stage and a second modification stage; and
the first modification stage modifies a first vehicle system and the second modification stage modifies a second vehicle system; and
(d) modifying an operating characteristic of one or more electrical components of a vehicle system corresponding to the determined modification stage based on the expected battery range and the position of the charging station.

9. The method of claim 8, further comprising:
determining a difference between the expected battery range and an updated battery range;
determining whether to modify the operating characteristic based on the difference and based on reference information; and
identifying one or more vehicle systems based on the reference information.

10. The method of claim 8, wherein the modifying the operating characteristic is from a first setting to a modified setting, the method further comprising:
monitoring the operating characteristic;
updating the expected battery range based on the status information and based on monitoring the operating characteristic; and
determining to return to the first setting based on updating the expected battery range.

11. The method of claim 8, wherein the vehicle system comprises one of:
a cabin air system, and wherein modifying the operating characteristic comprises modifying at least one cabin air setting; or
a battery cooling system, and wherein modifying the operating characteristic comprises modifying at least one battery cooling setting, and wherein:
the vehicle system is configured to operate based on a setpoint; and
modifying the operating characteristic comprises modifying the setpoint to cause the one or more electrical components to use less power.

12. The method of claim 8, wherein modifying the operating characteristic further comprises:
determining a power consumption limit;
identifying the vehicle system based on reference information; and
causing a reduction in power consumption of the one or more electrical components such that a total power consumption of the vehicle is within the power consumption limit.

13. A system comprising:
a communications interface configured to receive status information associated with environmental conditions along a route of a vehicle;
control circuitry coupled to the communications interface and configured to:
determine an expected battery range of the vehicle along the route;
determine a change from the expected battery range based on the status information;
determine, from a plurality of modification stages, a modification stage based on the change, wherein:
the plurality of modification stages comprises a first modification stage and a second modification stage; and
the first modification stage modifies a first vehicle system and the second modification stage modifies a second vehicle system; and
modifying an operating characteristic of one or more electrical components of a vehicle system corresponding to the determined modification stage to compensate for the change; and
an output device configured to display the expected battery range to an occupant.

14. The system of claim 13, wherein the control circuitry is further configured to determine an updated battery range based at least in part on the status information.

15. The system of claim 13, wherein:
the control circuitry is further configured to determine vehicle operating information; and
the control circuitry is configured to determine the change from the expected battery range further based on the vehicle operating information.

16. The system of claim 13, wherein the control circuitry is further configured to:
determine whether to modify the operating characteristic based on the change and based on a change criterion; and
modify the operating characteristic by:
identifying the vehicle system based on reference information; and
identifying a modification based on the change.

17. The system of claim 13, wherein the control circuitry is further configured to:
identify a charging station having a location, wherein:
facilitating the modification of modifying the operating characteristic is further based on the change from the expected battery range-and based on the location of the charging station.

18. The system of claim 13, wherein the vehicle system comprises one of:
a cabin air system, wherein the operating characteristic comprises a compressor speed or a fan speed;
a drive system, wherein the operating characteristic comprises a motor current;
a lighting system, wherein the operating characteristic comprises a current; or
a battery cooling system, wherein the operating characteristic comprises a pump speed or a fan speed.

19. The system of claim 13, wherein the control circuitry is further configured to:
determine the expected battery range by determining a range trajectory at a first time based on the route, wherein the range trajectory comprises a plurality of battery range estimates from a current location to a destination; and
determine the change by identifying a deviation from the range trajectory based on an updated range trajectory determined at a second time based on the status information.

20. The system of claim 13, wherein the modifying the operating characteristic is from a first setting to a modified setting, and wherein the control circuitry is further configured to:

monitor the operating characteristic of the one or more electrical components;
determine the change by updating the expected battery range based on the status information and based on monitoring the operating characteristic; and
determine to return to the first setting based on updating the expected battery range.

\* \* \* \* \*